United States Patent
Sadeghi et al.

(10) Patent No.: US 10,033,490 B2
(45) Date of Patent: Jul. 24, 2018

(54) FULL DUPLEX OPERATION IN WIRELESS SYSTEMS

(71) Applicant: INTERDIGITAL PATENT HOLDINGS, INC., Wilmington, DE (US)

(72) Inventors: Pouriya Sadeghi, San Diego, CA (US); Janet A. Stern-Berkowitz, Little Neck, NY (US); Moon-il Lee, Melville, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 147 days.

(21) Appl. No.: 15/123,832

(22) PCT Filed: Mar. 6, 2015

(86) PCT No.: PCT/US2015/019255
§ 371 (c)(1),
(2) Date: Sep. 6, 2016

(87) PCT Pub. No.: WO2015/134907
PCT Pub. Date: Sep. 11, 2015

(65) Prior Publication Data
US 2017/0019218 A1    Jan. 19, 2017

Related U.S. Application Data

(60) Provisional application No. 61/948,987, filed on Mar. 6, 2014.

(51) Int. Cl.
H04W 72/04    (2009.01)
H04L 1/18    (2006.01)
(Continued)

(52) U.S. Cl.
CPC .......... *H04L 1/1887* (2013.01); *H04L 1/1822* (2013.01); *H04L 5/001* (2013.01);
(Continued)

(58) Field of Classification Search
CPC ..... H04L 5/1469; H04L 1/1887; H04L 5/001; H04L 5/0055; H04L 5/0094;
(Continued)

(56) References Cited

U.S. PATENT DOCUMENTS

2013/0051269 A1\* 2/2013 Suzuki ................. H04L 1/1812
370/252
2013/0215862 A1\* 8/2013 Suzuki ................. H04L 1/1829
370/329
(Continued)

FOREIGN PATENT DOCUMENTS

EP    2 693 799    2/2014

OTHER PUBLICATIONS

"Full Duplex Wireless," available at https://web.archive.org/web/20150225020248/http://cmc.rice.edu/full-duplex (Feb. 25, 2015).
(Continued)

*Primary Examiner* — Robert Lopata
(74) *Attorney, Agent, or Firm* — Volpe and Koenig, P.C.

(57) ABSTRACT

A method and apparatus for providing for full-duplex (FD) operation in time division duplex (TDD) communications are disclosed herein. A wireless transmit/receive unit (WTRU) may receive an indication of a first, UL heavy, TDD uplink (UL)/downlink (DL) configuration and an indication of a second, DL heavy, TDD UL/DL configuration. The WTRU may also receive a grant in a common DL subframe. The WTRU may apply the hybrid automatic repeat request (HARQ) process timing associated with one of the TDD UL/DL configurations for DL HARQ feedback. Also, the WTRU may monitor a set of subframes for a UL
(Continued)

or a DL grant. Further, the WTRU may receive a grant in a subframe which may include an indication of a reference TDD UL/DL configuration. The WTRU may then apply the HARQ process timing associated with the reference TDD UL/DL configuration for DL HARQ feedback.

20 Claims, 16 Drawing Sheets

(51) Int. Cl.
  *H04L 5/00* (2006.01)
  *H04L 5/14* (2006.01)
(52) U.S. Cl.
  CPC .......... *H04L 5/0055* (2013.01); *H04L 5/0094* (2013.01); *H04L 5/1469* (2013.01); *H04W 72/042* (2013.01); *H04W 72/0446* (2013.01)
(58) Field of Classification Search
  CPC ... H04L 1/1822; H04L 1/1861; H04L 1/1896; H04W 72/042; H04W 72/0446
  USPC .......................................................... 370/280
  See application file for complete search history.

(56) References Cited

U.S. PATENT DOCUMENTS

| | | | | |
|---|---|---|---|---|
| 2013/0242824 | A1* | 9/2013 | Lee ....................... | H04L 1/1819 370/281 |
| 2013/0294242 | A1* | 11/2013 | Zhao ................. | H04W 72/1252 370/235 |
| 2013/0301490 | A1* | 11/2013 | He .......................... | H04W 4/90 370/280 |
| 2013/0336177 | A1 | 12/2013 | Gao et al. | |
| 2013/0336267 | A1* | 12/2013 | Li .......................... | H04L 1/1854 370/329 |
| 2014/0086112 | A1* | 3/2014 | Stern-Berkowitz ......................... | H04W 72/1289 370/280 |
| 2014/0293883 | A1* | 10/2014 | Wang .................... | H04W 72/04 370/329 |
| 2015/0117275 | A1* | 4/2015 | Park ...................... | H04L 1/1812 370/280 |
| 2015/0229461 | A1 | 8/2015 | DiFazio et al. | |
| 2015/0327229 | A1* | 11/2015 | Zhang ................... | H04L 1/1854 370/280 |
| 2016/0128095 | A1* | 5/2016 | Damnjanovic ....... | H04W 72/14 370/336 |
| 2016/0198450 | A1* | 7/2016 | Wei .......................... | H04L 1/00 370/329 |
| 2016/0352472 | A1* | 12/2016 | Ahn ....................... | H04L 1/1887 |
| 2017/0078058 | A1* | 3/2017 | Marinier ............... | H04L 5/0044 |
| 2017/0245249 | A1* | 8/2017 | Suzuki ................. | H04W 72/042 |
| 2017/0331595 | A1* | 11/2017 | Rudolf .................. | H04L 1/1678 |
| 2017/0331611 | A1* | 11/2017 | Stern-Berkowitz ... | H04L 1/1854 |
| 2018/0014290 | A1* | 1/2018 | Yi ........................ | H04W 72/044 |
| 2018/0062818 | A1* | 3/2018 | Seo ....................... | H04L 1/1896 |

OTHER PUBLICATIONS

Interdigital, "On signaling and fallback operation for TDD UL-DL reconfiguration," 3GPP TSG-RAN WG1 Meeting #74, R1-133175, Barcelona, Spain (Aug. 19-23, 2013).
Jain et al., "Practical, Real-Time, Full Duplex Wireless," Mobicom '11, Las Vegas, Nevada (Sep. 19-23, 2011).
LG Electronics, "HARQ Timeline and Feedback for TDD eIMTA," 3GPP TSG RAN WG1 Meeting #74, R1-133367, Barcelona, Spain (Aug. 19-23, 2013).
Nguyen et al., "Transmission Strategies for Full Duplex Multiuser MIMO Systems," International Workshop on Small Cell Wireless Networks 2012, pp. 6825-6829 (2012).
Sharp, "PUCCH resource allocation for dynamic HARQ-ACK in eIMTA," 3GPP TSG RAN WG1 Meeting #76, R1-140637, Prague, Czech Republic (Feb. 10-14, 2014).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).
Third Generation Partnership Project, "Technical Specification Group Radio Access Network; Evolved Universal Terrestrial Radio Access (E-UTRA); Physical channels and modulation (Release 11)," 3GPP TS 36.211 V11.6.0 (Sep. 2014).
Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).
Third Generation Partnership Project, "Technical Specification Group Radio Access Network; Evolved Universal Terrestrial Radio Access (E-UTRA); Physical channels and modulation (Release 12)," 3GPP TS 36.211 V12.4.0 (Dec. 2014).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.5.0 (Dec. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).
Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).
Third Generation Partnership Project, "Technical Specification Group Radio Access Network; Evolved Universal Terrestrial Radio

(56) References Cited

OTHER PUBLICATIONS

Access (E-UTRA); Physical layer procedures (Release 10)," 3GPP TS 36.213 V10.12.0 (Mar. 2014).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).
Third Generation Partnership Project, "Technical Specification Group Radio Access Network; volved Universal Terrestrial Radio Access (E-UTRA); Radio Resource Control (RRC); Protocol specification (Release 8)," 3GPP TS 36.331 V8.21.0 (Jun. 2014).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.18.0 (Jun. 2014).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.6.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.0.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.10.0 (Dec. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.4.1 (Dec. 2014).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.15.0 (Dec. 2014).
Third Generation Partnership Project, "Technical Specification Group Radio Access Network; Evolved Universal Terrestrial Radio Access (E-UTRA); Physical layer procedures (Release 11)," 3GPP TS 36.213 V11.9.0 (Dec. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.3.0 (Dec. 2014).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.5.1 (Sep. 2014).

* cited by examiner

| UPLINK-DOWNLINK CONFIGURATION | UPLINK-TO-DOWNLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 3

| SPECIAL SUBFRAME CONFIGURATION | NORMAL CYCLIC PREFIX IN DOWNLINK | | | | EXTENDED CYCLIC PREFIX IN DOWNLINK | | |
|---|---|---|---|---|---|---|---|
| | DwPTS | GP | UpPTS | | DwPTS | GP | UpPTS |
| | | | NORMAL CYCLIC PREFIX IN UPLINK | | | | EXTENDED CYCLIC PREFIX IN UPLINK |
| 0 | 3 | 10 | 1 | | | | 1 |
| 1 | 9 | 4 | 1 | | 3 | 8 | 1 |
| 2 | 10 | 3 | 1 | | 8 | 3 | 1 |
| 3 | 11 | 2 | 1 | | 9 | 2 | 1 |
| 4 | 12 | 1 | 1 | | 10 | 1 | 2 |
| 5 | 3 | 9 | 2 | | 3 | 7 | 2 |
| 6 | 9 | 3 | 2 | | 8 | 2 | 2 |
| 7 | 10 | 2 | 2 | | 9 | 1 | 2 |
| 8 | 11 | 1 | 2 | | 5 | 5 | 1 |
| 9 | 6 | 6 | 2 | | — | — | — |

| TDD UL/DL CONFIGURATION | SUBFRAME NUMBER n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | ⑥ 610 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 6

| UL/DL CONFIGURATION | SUBFRAME NUMBER n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 7 | – | 9 |
| 1 | – | – | (7, 6) 710 | 4 | – | – | – | 7 | 4 | 4 |
| 2 | – | – | 8, 7, 4, 6 | – | – | – | – | 7, 6 | 4 | – |
| 3 | – | – | 7, 6, 11 | 6, 5 | 5, 4 | – | – | 8, 7, 4, 6 | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG. 7

| TDD UL/DL CONFIGURATION | \multicolumn{10}{c}{SUBFRAME NUMBER n} |
| --- | --- | --- | --- | --- | --- | --- | --- | --- | --- | --- |
| | 0 | 1 | 2 | 3 | 4 | 5 | 6 | 7 | 8 | 9 |
| 0 | | | 4 | 7 | 6 | | | 4 | 8 | 9 |
| 1 | | | ④ 810 | 6 | | | | 4 | 7 | 6 |
| 2 | | | 6 | | | | | 6 | 6 | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 8

FULL DUPLEX OPERATION IN WIRELESS SYSTEMS

CROSS REFERENCE TO RELATED APPLICATIONS

This application is the U.S. National Stage, under 35 U.S.C. § 371, of International Application No. PCT/US2015/019255 filed Mar. 6, 2015, which claims the benefit of U.S. Provisional Application Ser. No. 61/948,987 filed Mar. 6, 2014, the contents of which is hereby incorporated by reference herein.

BACKGROUND

Conventional two-way communication systems may separate transmit (Tx) and receive (Rx) signals at each device from one another in at least one of frequency, time, and space.

For example, in a conventional frequency division duplex (FDD) communication system, frequency separation may be used to separate Tx and Rx signals. In a single carrier (also called single channel) configuration, communication between a network and a user device such as a wireless transmit/receive unit (WTRU) may use two frequency bands, one in the uplink (UL) for communication to the network and one in the downlink (DL) for communication from the network. Enough spacing may be provided between the UL and DL channels to permit filters to adequately attenuate energy from the transmitted signal that may leak into the received signal.

In a conventional time division duplex (TDD) system, time separation may be used to separate Tx and Rx signals. In a single carrier (or single channel) configuration, communication uses a single band which is shared in time between UL and DL. However in full duplex (FD) systems a channel may be used to transmit and receive the radio frequency (RF) signal simultaneously.

SUMMARY

A method and apparatus for providing for full-duplex (FD) operation in time division duplex (TDD) communications are disclosed herein. A wireless transmit/receive unit (WTRU) may receive an indication of a first TDD uplink (UL)/downlink (DL) configuration, which may be a UL heavy configuration, and an indication of a second TDD UL/DL configuration, which may be a DL heavy configuration. The WTRU may also receive a grant in a DL subframe, which may be common to both the first TDD UL/DL configuration and the second TDD UL/DL configuration. The WTRU may apply the hybrid automatic repeat request (HARQ) process timing associated with one of the TDD UL/DL configurations for DL HARQ feedback. Accordingly, the WTRU may apply the HARQ process timing associated with the first TDD UL/DL configuration. Further, the WTRU may apply the HARQ process timing associated with the second TDD UL/DL configuration.

Also, the WTRU may monitor a set of subframes for a UL or a DL grant. Further, the WTRU may receive a grant in a subframe which may include an indication of a reference TDD UL/DL configuration. The WTRU may then apply the HARQ process timing associated with the reference TDD UL/DL configuration for DL HARQ feedback.

The WTRU may apply the HARQ process timing based on the grant. Further, the WTRU may apply the HARQ process timing based on an indication of the TDD UL/DL configuration. In addition, the WTRU may transmit the DL HARQ feedback via a Physical UL Control Channel (PUCCH).

Further, a method comprises configuring FD radio (FDR) subframes from corresponding subframes of at least two TDD uplink UL/DL configurations having different directions is also disclosed herein. The TDD UL/DL configurations may include a cell-specific configuration and a WTRU-specific configuration. Two or more HARQ processes may be maintained, each associated with a different reference TDD UL/DL configuration.

BRIEF DESCRIPTION OF THE DRAWINGS

A more detailed understanding may be had from the following description, given by way of example in conjunction with the accompanying drawings wherein:

FIG. 3 is a table illustrating example uplink/downlink (UL/DL) configurations;

FIG. 5 is a table illustrating an example configuration of special subframes;

FIG. 6 is a table illustrating example UL scheduling timing for TDD UL/DL configurations;

FIG. 7 is a table illustrating an example association set index for TDD DL hybrid automatic repeat request (HARQ);

FIG. 8 is a table illustrating example resource scheduling for TDD UL/DL configurations;

DETAILED DESCRIPTION

Figure 1A:
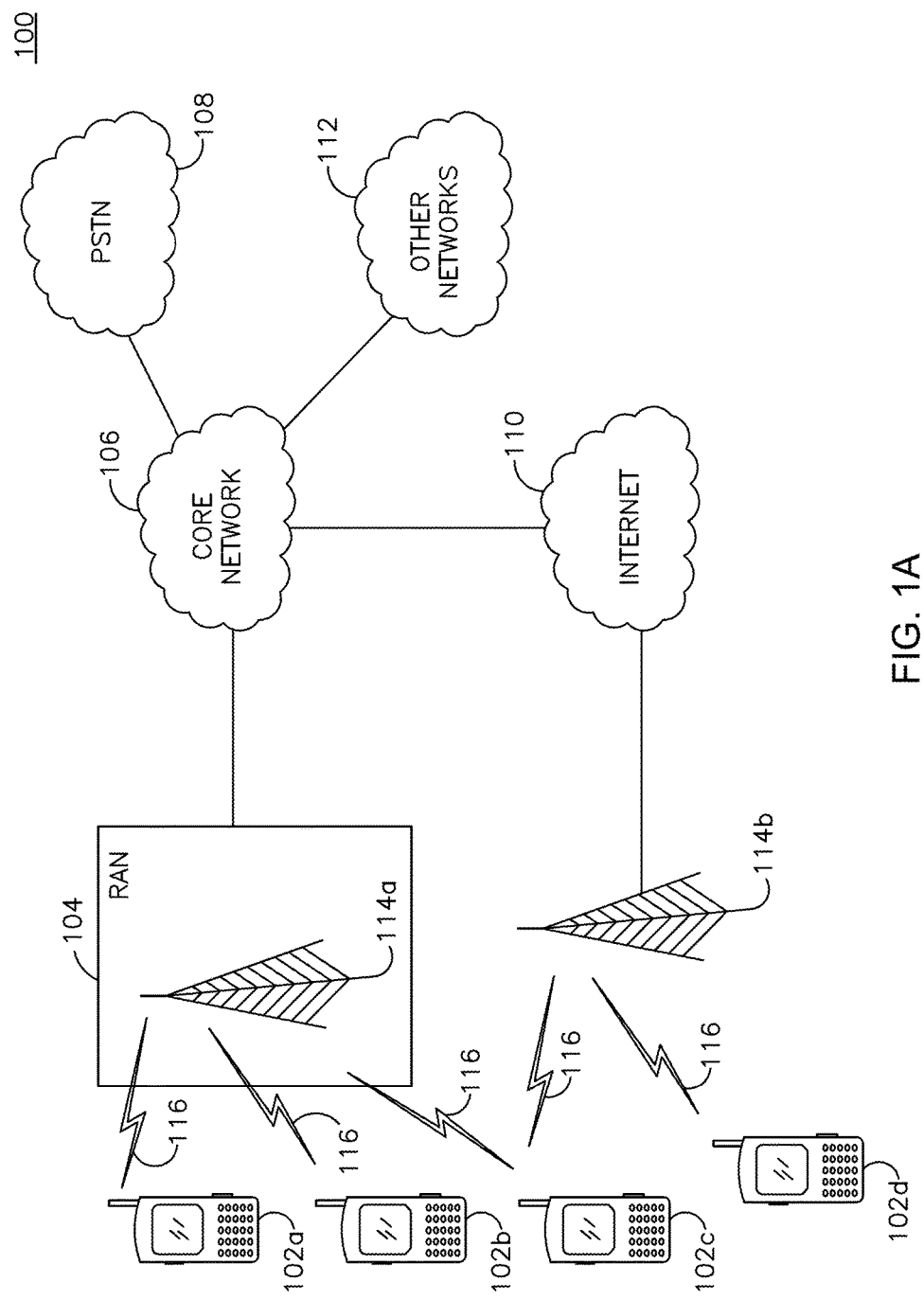
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
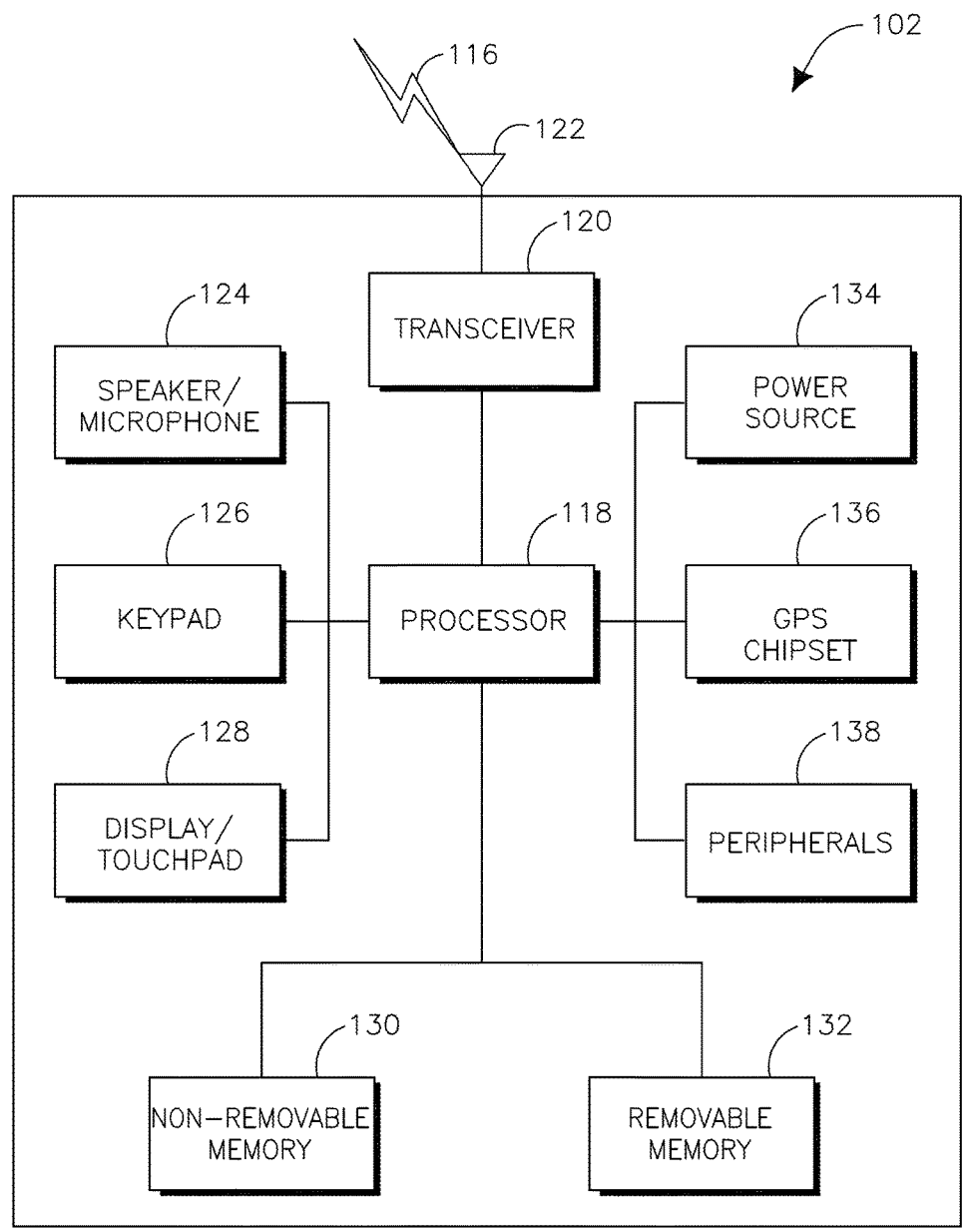
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
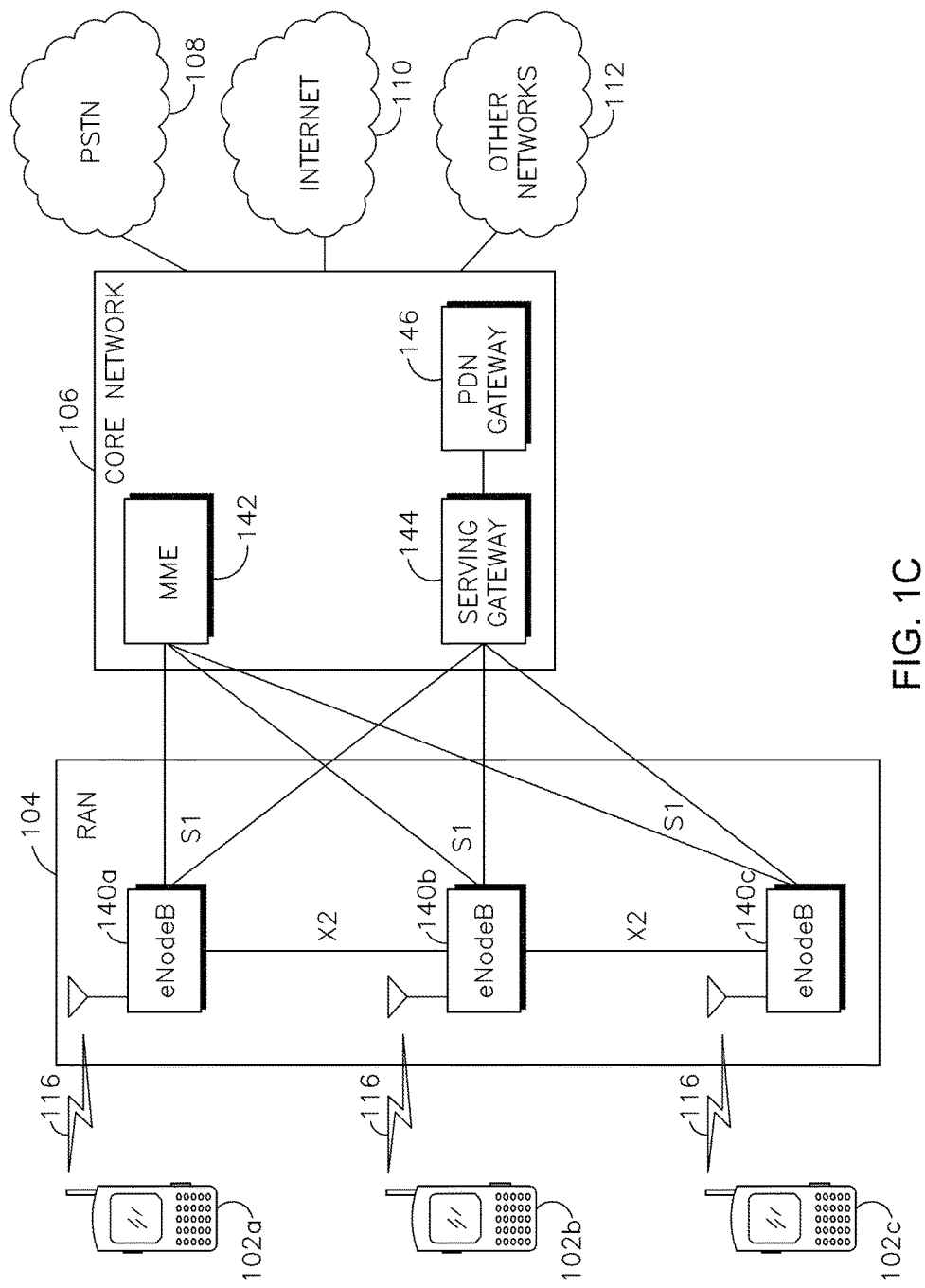
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Conventional two-way communication systems may separate transmit (Tx) and receive (Rx) signals at each device from one another in at least one of frequency, time, and space.

For example, in a conventional frequency division duplex (FDD) communication system, frequency separation may be used to separate Tx and Rx signals. In a single carrier (also called single channel) configuration, communication between a network and a user device such as a WTRU may use two frequency bands, one in the uplink (UL) for communication to the network and one in the downlink (DL) for communication from the network. Enough spacing may be provided between the UL and DL channels to permit filters to adequately attenuate energy from the transmitted signal that may leak into the received signal.

In a conventional time division duplex (TDD) system, time separation may be used to separate Tx and Rx signals. In a single carrier (or single channel) configuration, communication uses a single band which is shared in time between UL and DL. In a system such as Third Generation Partnership Project (3GPP) Long Term Evolution (LTE) TDD, a 10 ms frame may be divided into ten 1 millisecond (ms) subframes where each subframe may be used for DL (D), for UL (U), or as a special subframe (S) which may include a DL part, a UL part, and a gap between the two to allow for transition from DL to UL.

In full duplex (FD) systems a channel may be used to transmit and receive the RF signal simultaneously. Techniques are contemplated herein for operation of a TDD-type system where timeslots may be allocated as DL, UL, or full duplex single channel (FDSC). Timeslots which are FDSC may be used for simultaneous UL and DL communication between an FDSC-capable BS and an FDSC-capable WTRU. FDSC timeslots may also be used by an FDSC-capable BS for simultaneous communication with at least one WTRU in the DL and at least one other WTRU in the UL where the WTRUs may not be FDSC-capable. FDSC may correspond to one or more of Tx and Rx bands which may be separated by a small gap, such as one not supportable by conventional systems, Tx and Rx bands which may be separated by a zero band gap, partially overlapping Tx/Rx bands, or fully overlapping Tx/Rx bands. FDSC may be used interchangeably with full duplex radio (FDR), full duplex single frequency (FDSF), and full duplex single resource (FDSR).

Examples may include using 3GPP TDD LTE where the "timeslots" are the 1 ms subframes of the LTE 10 ms frame. In some examples, the TDD UL/DL configurations defined in the 3GPP specifications may be modified to include full duplex (F) subframes in place of some of the U, D, and S subframes. Other examples may provide flexibility in splitting subframes between UL and DL at the resource block (RB) level where an RB is the unit of resource allocation in LTE, corresponding to 12 subcarriers in frequency and a number of Orthogonal Frequency Division Multiplexing (OFDM) symbols in time.

Radio resource management (RRM) techniques may include assigning timeslots for FDSC operation, choosing WTRUs that are suitable for Tx and/or Rx in FDSC timeslots, and pairing WTRUs for half-duplex (UL or DL) operation in the same timeslot. A goal of the RRM may include making assignments such that Tx interference or leakage into Rx (Tx-Rx coupling) does not prevent the successful reception of the Rx signal. Measurements, capabilities, WTRU location, and other factors may be taken into account. An example application suggests that limiting FDSC communication to WTRUs close to the BS may be a way to limit interference.

This application relates to FDR operation in LTE TDD systems and different mechanisms for creating and identifying FDR subframes, as well as hybrid automatic repeat request (HARQ) process operations (e.g., UL/DL scheduling and HARQ operation) for FDR subframes. The examples described herein may not require new TDD UL/DL configurations, and at the same time, may support the operation of legacy WTRUs within an FDR capable system.

Wireless communication systems compliant with 3GPP LTE may support up to 100 megabits per second (Mbps) in the DL, and up to 50 Mbps in the UL for a 2×2 configuration. The LTE DL scheme may be based on an OFDMA air interface. Each radio frame may consist of ten subframes of 1 ms each. Each subframe may consist of two timeslots of 0.5 ms each. There may be either seven or six OFDM symbols per timeslot. Seven symbols per timeslot may be used with normal cyclic prefix (CP) length, and six symbols per timeslot may be used with extended CP length. The subcarrier spacing for a particular specification may be 15 kilohertz (kHz). A reduced subcarrier spacing mode using 7.5 kHz may also be possible. Frame and radio frame may be used interchangeably.

A resource element (RE) may correspond to one subcarrier during one OFDM symbol interval. Twelve consecutive subcarriers during a 0.5 ms timeslot may constitute one resource block (RB). With seven symbols per timeslot, each RB may consist of 12×7=84 REs.

The basic time-domain unit for dynamic scheduling may be one subframe consisting of two consecutive timeslots. This may sometimes be referred to as a RB pair. Certain subcarriers on some OFDM symbols may be allocated to carry pilot or reference signals in the time-frequency grid. A number of subcarriers at the edges of the transmission bandwidth might not be transmitted in order to comply with spectral mask requirements.

Uplink channels which may be provided and/or used include a Physical UL Shared Channel (PUSCH) and/or Physical UL Control Channel (PUCCH). Control information, which may be referred to as UL Control Information (UCI) may be transmitted by a WTRU, for example in a subframe, on the PUSCH or the PUCCH, or part may be transmitted on the PUCCH and part on the PUSCH. UCI may include one or more of a HARQ acknowledgement (ACK)/negative acknowledgement (NACK), scheduling request (SR), and/or Channel State Information (CSI) which may include one or more of a Channel Quality Indicator (CQI), Precoding Matrix Indicator (PMI), and Rank Indicator (RI). Resources which may be allocated for PUCCH transmission may be located at or near the edges of the UL band.

Downlink channels which may be provided and/or used include a Physical Downlink Shared Channel (PDSCH) and/or downlink control channels which may include one or more of a Physical Control Format Indicator Channel (PCFICH), Physical Hybrid-ARQ Indicator Channel (PHICH), Physical Downlink Control Channel (PDCCH), and/or Enhanced PDCCH (EPDCCH). The control information for the scheduling of PDSCH and PUSCH may be sent on a PDCCH or an EPDCCH.

In single carrier configuration where the network (NW) may assign a WTRU only one pair of UL and DL carriers (FDD) or one carrier time shared for UL and DL (TDD), for any given subframe there may be a single HARQ process active for the UL and a single HARQ process active in the DL.

Carrier Aggregation (CA) may improve single carrier LTE data rates using, among other solutions, bandwidth extensions, where an LTE carrier may be extended to include and/or take advantage of some physical resource blocks (PRBs) adjacent and/or non-adjacent to the PRBs of that LTE carrier. With CA, the WTRU may transmit and receive simultaneously over the PUSCH and PDSCH, respectively, of multiple serving cells. Up to four secondary serving cells (SCells) may be used in addition to a Primary serving Cell (PCell) which may support flexible bandwidth assignments up to 100 megahertz (MHz). A serving cell may also be referred to as a component carrier.

Scheduling of PDSCH and PUSCH may be performed using the PDCCH (or EPDCCH) of the serving cell for which the resources are being scheduled. This may be referred to as self-scheduling. Scheduling of PDSCH and PUSCH may be performed using the PDCCH (or EPDCCH) of a different serving cell than the one for which the resources are being scheduled. This may be referred to as cross-carrier scheduling.

For an FDD LTE WTRU operating with CA, there may be one HARQ entity for each serving cell, where each HARQ entity may have 8 HARQ processes, which may correspond to one HARQ process per subframe for one round-trip time (RTT). There may be more than one HARQ process active for the UL and for the DL in a given subframe, but at most one UL and one DL HARQ process per configured serving cell.

For a TDD WTRU operating with CA, there may be one HARQ entity for each serving cell, where the number of HARQ processes for each cell is a function of the TDD UL/DL configuration of that serving cell.

In the FDD mode of operation, different carriers may be used for UL and DL transmissions and a full duplex WTRU may simultaneously receive in the DL and transmit in the UL. In the TDD mode of operation, UL and DL transmissions may be performed on the same carrier frequency and be separated in time. For a given carrier a WTRU may not simultaneously receive in the DL and transmit in the UL. A 10-ms TDD frame may consist of 10 subframes of 1 ms each.

Figure 2:
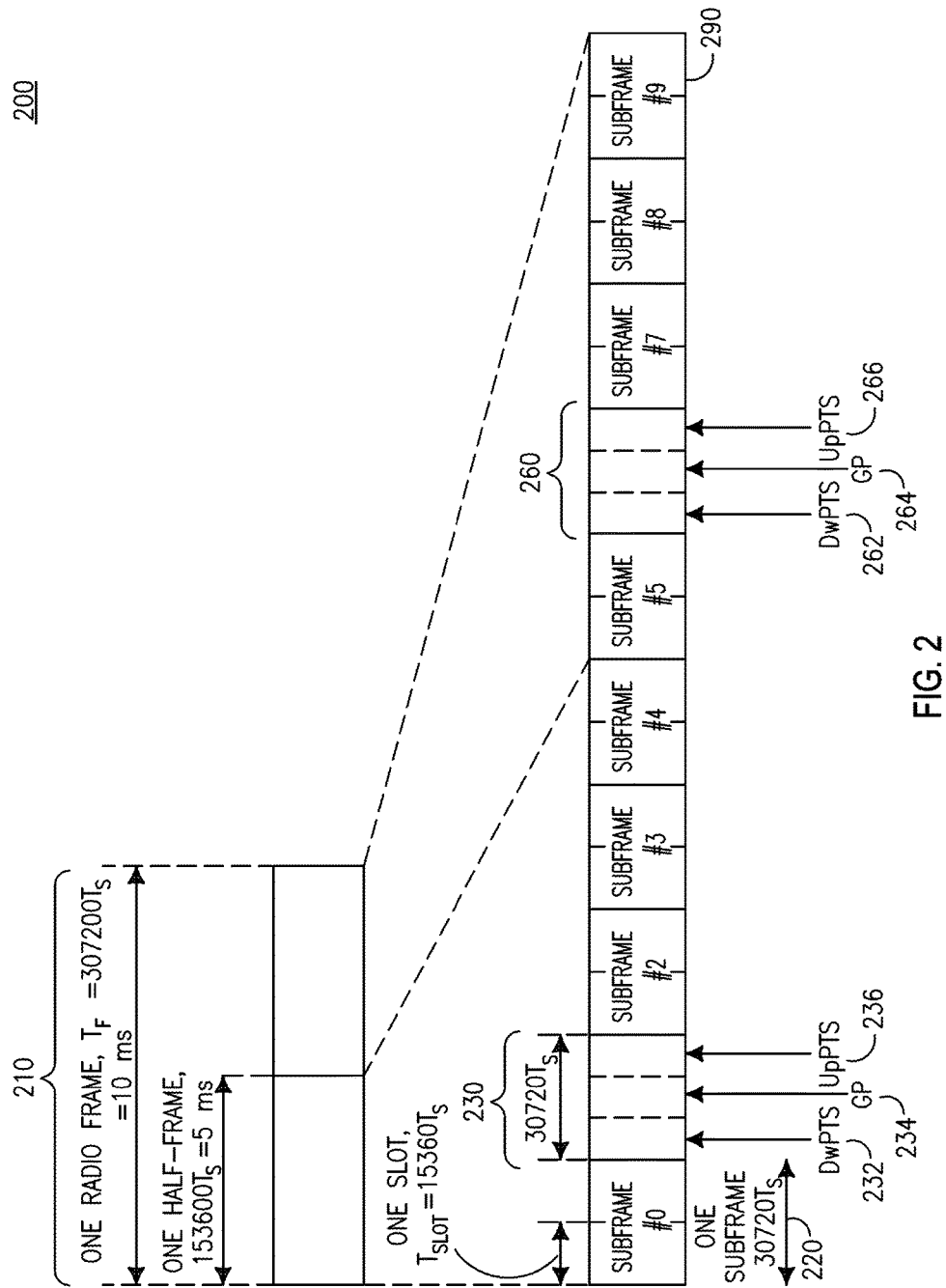
FIG. 2 is a diagram illustrating an example frame structure.

FIG. 2 is a diagram illustrating an example frame structure. The frame structure 200 may be considered a type 2 frame structure and include a 10 ms TDD radio frame 210, which may have a 5 ms switch-point periodicity. The radio frame 210 may include ten subframes 220 through 290 of 1 ms each, which may be numbered subframe #0 through subframe #9. In another example, the frame structure may have a 10 ms switch-point periodicity.

In an example, the switching from DL subframes to UL subframes may occur in subframe 1, shown as 230, and possibly subframe 6, shown as 260, which may be referred to as special subframes. In an example of a frame structure with a 10 ms switch-point periodicity, the switching may occur only once in each frame structure, such as in subframe 1. In another example, the frame structure may have a 5 ms switch-point periodicity and the switching may occur twice in each frame structure, such as in subframe 1 and subframe 6.

Special subframes 230, 260 may consist of a DL part, which may be a Downlink Pilot Time Slot (DwPTS) 232, 262, a guard period (GP) 234, 264, and a UL part, which may be an Uplink Pilot Time Slot (UpPTS) 236, 266. Based on the TDD UL/DL configuration, the subframes may be divided between uplink and downlink.

FIG. 3 is a table illustrating example UL/DL configurations. Table 300 includes example TDD UL/DL configurations which may be supported in LTE along with the UL/DL switching point periodicity of the different configurations and the subframes which may correspond to the configurations. In an example shown in FIG. 3, D denotes a DL subframe, U denotes a UL subframe and S denotes a special subframe. In an example, the switching from DL subframes to UL subframes may occur in subframe 1, shown as 310, and possibly subframe 6, shown as 360, which may include special subframes.

Figure 4A:
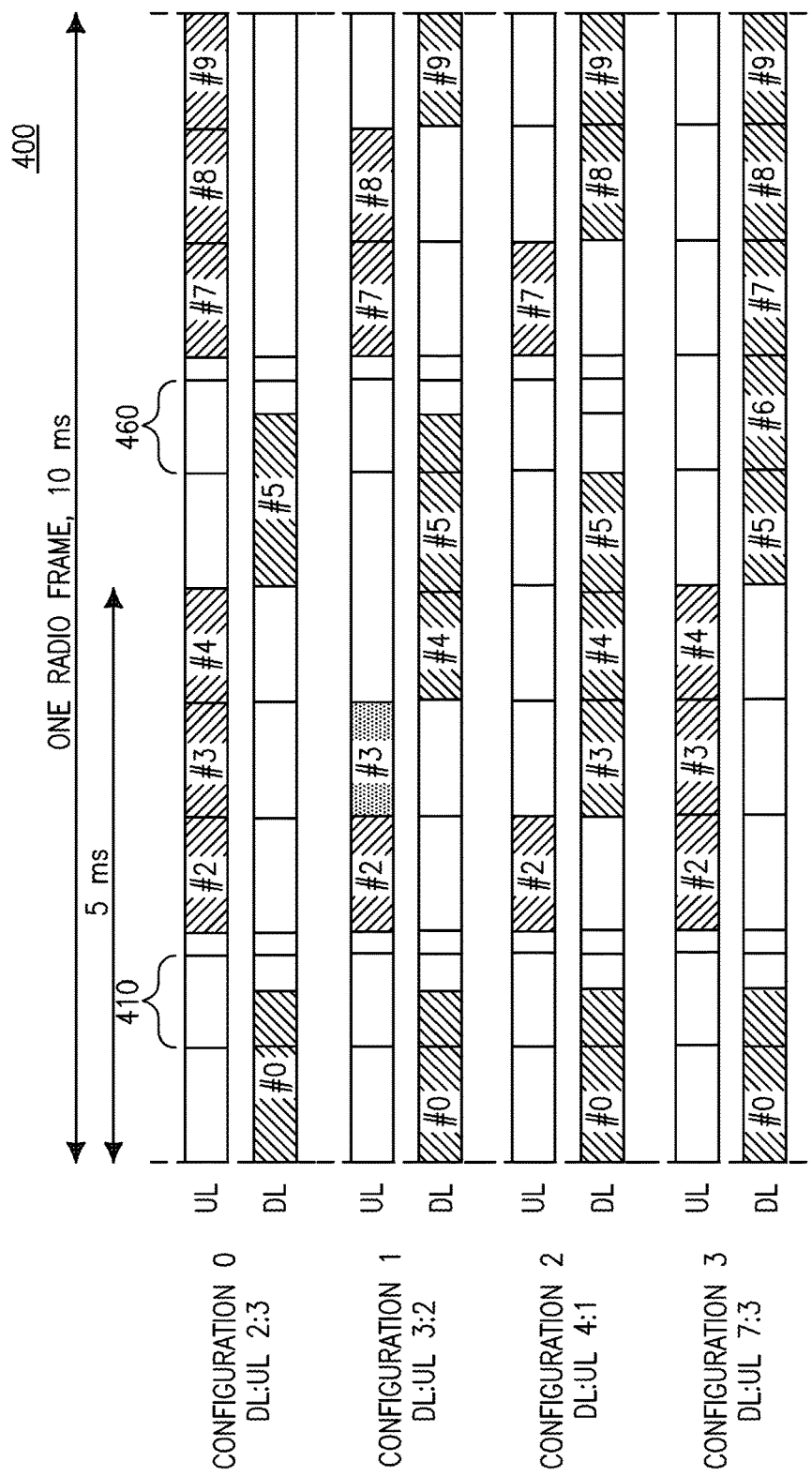
FIGS. 4A and 4B are diagrams illustrating example time division duplex (TDD) UL/DL configurations.
Figure 4B:
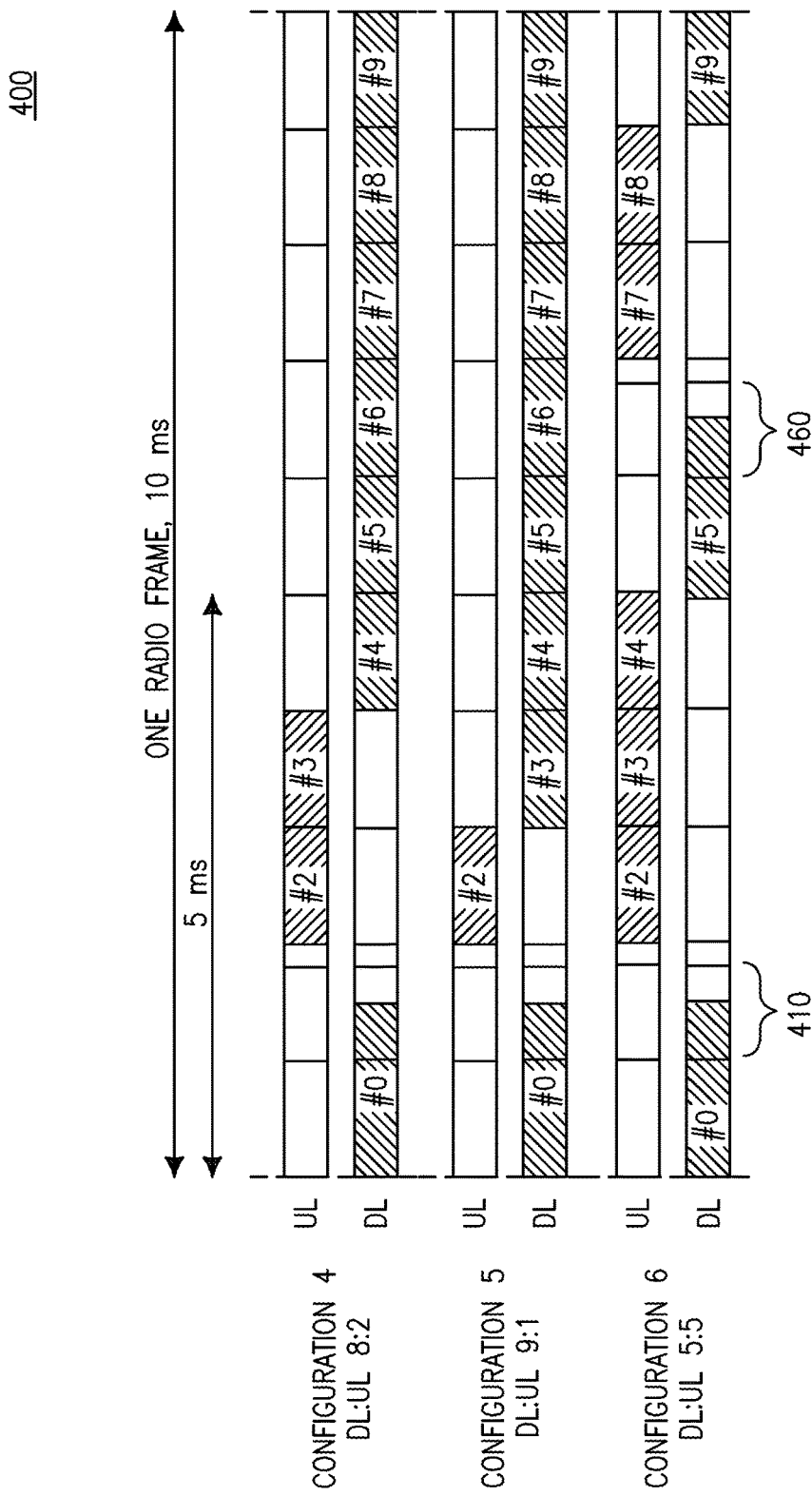

FIGS. 4A and 4B are diagrams illustrating example time division duplex (TDD) UL/DL configurations. The frame structures 400 are pictorial representations of the seven TDD UL/DL configurations (configurations 0 through 6) with subframe arrangements illustrated in FIG. 3. Configurations 0, 1, 2 and 6 illustrate examples of frame structures which may have 5 ms switch-point periodicities and switching occurring twice in each frame structure, such as in subframe 1 and subframe 6. Configurations 3, 4 and 5 illustrate examples of frame structures which may have 10 ms switch-point periodicities and switching occurring once in each frame structure, such as in subframe 1. In an example, the switching from DL subframes to UL subframes may occur in subframe 1, shown as 410, and possibly subframe 6, shown as 460, which may include special subframes.

FIG. 5 is a table illustrating an example configuration of special subframes. In an example shown in Table 500, the same CP may be used in both DL and UL and the lengths of the DwPTS, GP and UpPTS may be shown in OFDM symbols.

As shown in FIG. 5, in the normal CP case, the GP may be one of 1, 2, 3, 4, 6, 9 and 10 OFDM symbols long. In the extended CP case, the GP may be one of 1, 2, 3, 5 , 7 and 8 OFDM symbols long. A special subframe may have at least one OFDM symbol for UpPTS. DwPTS may be treated as a normal but shortened DL subframe which may carry DL control signals (e.g., PDCCH, PCFICH, PHICH) and possibly DL data. In TDD operation, a WTRU may require guard time when changing from UL transmission to DL reception and vice versa. The special subframe UL part may carry sounding reference signal (SRS) or Random Access requests. As disclosed herein, special subframes may be treated as DL subframes.

To minimize or reduce interference among neighboring cells, the same TDD UL/DL configuration may be used for neighboring cells. To avoid potential disruption to connections, the configuration may not be changed often. The number of the TDD UL and DL HARQ processes may depend on the TDD UL/DL configuration.

For TDD intra-band CA, the aggregated carriers may (or may only) have the same TDD UL/DL configurations. For inter-band CA, the aggregated carriers for TDD may have the same or different TDD UL/DL configurations.

Considering the 10-subframe periodicity of multicast-broadcast single-frequency network (MBSFN) configuration patterns, in FDD the subframes {0,4,5,9} may or may not be configured as MBSFN subframes, whereas in TDD, the subframes {0,1,2,5,6} may or may not be configured as MBSFN subframes.

TDD DL scheduling timing may be the same as that of FDD. The WTRU may receive a scheduling grant for a DL transmission in the same subframe as the DL transmission. TDD DL HARQ protocol may be asynchronous and adaptive. There may always be a PDCCH carrying a DL grant for every DL re-transmission.

FIG. 6 is a table illustrating example UL scheduling timing for TDD UL/DL configurations. Example values of k for uplink scheduling timing are shown in Table 600 for configurations 0 through 6 and for subframes 0 through 9. Considering an example of the UL scheduling and re-transmission timing, for TDD UL/DL configurations 1 through 6, upon detection of a PDCCH with uplink downlink control information (DCI) format and/or a PHICH transmission in subframe n intended for the WTRU by that WTRU, the WTRU may transmit a PUSCH in subframe n+k, with k given as shown in FIG. 6, according to the PDCCH and PHICH information.

In an example for TDD UL/DL configuration 0, upon detection by a WTRU of a PDCCH with uplink DCI format and/or a PHICH transmission in subframe n intended for that WTRU, the WTRU may transmit a PUSCH in subframe n+k if the most significant bit (MSB) of the UL index in the PDCCH with uplink DCI format is set to 1 or PHICH is received in subframe n=0 or 5 in the resource corresponding to IPHICH=0, with k given in FIG. 6, where IPHICH=1 for TDD UL/DL configuration 0 with PUSCH transmission in subframe n=4 or 9, and IPHICH=0, otherwise.

If, for TDD UL/DL configuration 0, the least significant bit (LSB) of the UL index in the DCI format 0/4 is set to 1 in subframe n or a PHICH is received in subframe n=0 or 5 in the resource corresponding to IPHICH=1, or PHICH is received in subframe n=1 or 6, the WTRU may transmit a PUSCH in subframe n+7. If, for TDD UL/DL configuration 0, both the MSB and LSB of the UL index in the PDCCH with uplink DCI format are set in subframe n, the WTRU transmits a PUSCH in each of subframes n+k and n+7, with k given as shown in FIG. 6. As an example, for configuration 1, if a UL grant is received in the DL in subframe n=1, then from Table 600, k=6, as shown in 610, and the grant may be for a PUSCH in subframe n+k=1+6=7.

In TDD, the DL HARQ timing mechanism may be based on a bundling window which may consist of a set of DL subframes. The DL HARQ feedback bits corresponding to these DL subframes may be bundled together and sent to the eNode B in the same UL subframe either via a PUCCH or a PUSCH. A UL subframe n may carry the DL HARQ feedback bits for M DL subframes where M>=1.

FIG. 7 is a table illustrating an example association set index for TDD DL HARQ. Referring to Table 700, UL subframe n may carry the DL HARQ feedback bits of each DL subframe n−k, where k is an element of K, and K is a set of M elements (k0, k1, . . . , KM−1). M may be considered as the size of the bundling window in terms of DL subframes.

As an example, for configuration 1, UL subframe n=2 may carry the DL HARQ feedback bits for the 2 subframes n−k where k=7 and k=6, as shown in 710, which correspond to subframe 2-7 and sub-frame 2-6. Since the frames are 10 subframes each, this may correspond to subframes 5 and 6 in the previous frame.

FIG. 8 is a table illustrating example resource scheduling for TDD UL/DL configurations. For PUSCH transmissions scheduled from a scheduling cell in subframe n, a WTRU may determine the corresponding PHICH resource of that scheduling cell in subframe n+kPHICH, where kPHICH is given in Table 800. For a subframe bundling operation, the corresponding PHICH resource may be associated with the last subframe in the bundle.

As an example, for configuration 1, if the WTRU transmits a PUSCH in subframe n=2, then it may expect a PHICH providing the UL HARQ-ACK feedback in subframe n+kPHICH, for example, kPHICH=4, as shown in 810. This may result in subframe 2+4=6.

In legacy TDD systems (for example, LTE release 10 and prior releases), every subframe may be assigned to either the UL or DL (including special subframes). The UL/DL subframe assignment may be determined by a TDD UL/DL configuration which also may define the timing for different operations such as DL/UL HARQ processing, DL/UL scheduling, and the like.

In order to take advantage of FDR capable WTRUs and/or eNode Bs and support FDR operation, FDR resources may be introduced into the system. In addition to the FDR resources, different procedures and processes to support these FDR resources, such as HARQ operation, scheduling, and the like, may be used.

The operation of an FDR capable eNode B might be improved if legacy WTRUs (including, for example, those which may be unaware of FDR operation) do not need to be supported. However, it may be inefficient to allocate bandwidth just for FDR capable eNode Bs and WTRUs. As a result, it would be desirable for an FDR capable eNode B to support legacy WTRUs and it would be desirable for solutions which support full duplex operation to be developed in a way that FDR capable WTRUs and legacy WTRUs can coexist.

For FDR operation, it may be possible to introduce new TDD UL/DL configurations, which may be an option for any new feature for TDD systems. However, the addition of a new TDD UL/DL configuration may further complicate TDD operation. Accordingly, it would be desirable not to introduce a new TDD UL/DL configuration unless it is necessary or provides significant gain. This should be considered in providing solutions for FDR operation in TDD systems.

Examples for creating and identifying FDR resources and for related HARQ process operations are described herein. An example of an FDR resource is a subframe where FDR operation may be supported. Such a subframe may be referred to as a Full-Duplex Radio Subframe (FDRS), where some or all of the PRBs of that subframe may be used for FDR operation.

As referred to herein, a legacy WTRU may be a WTRU which may not support FDR operation. Further, as referred to herein, an LTE Release 11 and/or prior release WTRUs may be referred to as legacy WTRUs and the terms may be used interchangeably. Further, as referred to herein, a WTRU-specific TDD configuration may be referred to as a procedure-specific TDD configuration, and the terms may be used interchangeably.

Examples disclosed herein may be used with enhanced Interference Mitigation and Traffic Adaption (eIMTA). Some examples approaches described herein include a WTRU having multiple TDD UL/DL configurations, for example both a cell specific TDD UL/DL configuration (for example, one which may be provided in system information such as system information block (SIB) 1) and a WTRU specific TDD UL/DL configuration (for example, one which may be provided by dedicated radio resource control (RRC) signaling). The cell specific TDD UL/DL configuration may be a UL heavier configuration and the WTRU-specific TDD UL/DL configuration may be a DL heavier configuration. While legacy WTRUs may only follow the cell-specific configuration, UL subframes in the cell-specific configuration which are DL in the WTRU-specific configuration may be stolen for DL for newer WTRUs. A subframe which may be UL in the cell-specific configuration and DL in the WTRU-specific configuration may be referred to as a conflicting subframe. The direction of a conflicting subframe at a certain time may be determined by a third TDD UL/DL configuration which may be provided dynamically. An eNode B scheduler may be used to avoid having a subframe scheduled for both UL and DL at the same time. To, for example, avoid conflicts with legacy WTRUs and the need to change HARQ timing when subframe directions change, for the WTRUs supporting eIMTA, the UL scheduling and HARQ timing may be according to the cell specific configuration (which may be referred to as the UL reference configuration) and the DL scheduling and HARQ timing may be according to the WTRU-specific configuration (which may be referred to as the DL reference configuration).

For the case of FDR, multiple TDD UL/DL configurations may be applied with the restriction to not transmit and receive in the same subframe removed for the eNode B, the WTRU, or both.

In some examples, different reference TDD UL/DL configurations for UL and/or DL HARQ processes including their related scheduling, data transmission, HARQ feedback, and so forth, may be used.

For example, a WTRU may be configured and/or maintain more than one, for example, two, sets of one or more DL (or UL) HARQ processes, where each set may be associated with a reference TDD UL/DL configuration and the WTRU may follow that configuration for the operation and/or timing of the DL (or UL) HARQ processes of that set.

A DL HARQ process may include one or a combination of the following components: the resource location where the WTRU may receive the DL grant, where examples of such resource location may include the subframe index in a radio frame, PRB number, and the like; the resource location where the WTRU may receive the DL data, for example, PDSCH, where examples of such resource location may include the subframe index in a radio frame, PRB number, and the like; the resource location and/or timing of the DL HARQ feedback provided by the WTRU, for example, via PUCCH and/or PUSCH transmission; and/or an index and/or number of the DL HARQ process.

A UL HARQ process may include one or a combination of the following components: the resource location where the WTRU may receive the UL grant, where examples of such resource location may include the subframe index in a radio frame, PRB number, and the like; the resource location and/or timing where the WTRU may transmit the UL data, for example, PUSCH, where examples of such resource location may include the subframe index in a radio frame, PRB number, and the like, and where an example of timing may include the case when the WTRU may transmit a PUSCH n subframes after it receives a UL grant and/or corresponding UL HARQ feedback (for example, via PHICH), which may be a function of the TDD UL/DL configuration, the index of the subframe which carried the UL grant, and the like; the resource location and/or timing of the UL HARQ feedback received by the WTRU, for example, PHICH; an index and/or number of the UL HARQ process.

In an example, a set of DL (or UL) HARQ processes may include a format. Further, a set of DL (or UL) HARQ processes may be indicated by one or more components of its DL (or UL) HARQ processes. For example, a set of DL (or UL) HARQ processes may be represented by a set of subframes, for example, a bit map indicating which subframe belongs to this set. As a further example, a WTRU may consider a DL (or UL) HARQ process belonging to this set if its corresponding DL PDSCH and/or DL grant (or its corresponding UL PUSCH and/or UL grant) is received in one of the subframes of this set. In a further example, a set of DL HARQ processes may be represented by a set of HARQ process numbers. In this case, upon reception of a DL grant by the WTRU and/or detection of the DL HARQ process number, the WTRU may determine which DL HARQ set that DL HARQ process belongs to.

A WTRU may determine the reference TDD UL/DL configuration for a set of DL (or UL) HARQ processes using at least one of the following. In an example, the WTRU may use a function of the cell specific TDD UL/DL configuration.

For example, a WTRU may use the cell specific TDD UL/DL configuration for at least one set of DL (or UL) HARQ processes. As another example, the WTRU may determine which TDD UL/DL configuration to use for at least one set of DL (or UL) HARQ processes based on the configured cell-specific TDD UL/DL configuration. In a further example, the WTRU may use a function of a WTRU-specific TDD UL/DL configuration. For example, a WTRU may directly receive a WTRU-specific TDD UL/DL configuration to be used for at least one set of DL (or UL) HARQ processes. In a further example, a WTRU may use a fixed and/or predetermined TDD UL/DL configuration. For example, a WTRU may use TDD UL/DL configuration 5 for at least one set of DL (or UL) HARQ processes.

A WTRU may determine the set of DL (or UL) HARQ processes using at least one of the following. In an example, the WTRU may use a function of the cell TDD UL/DL configuration. In a further example, the WTRU may use a function of a WTRU-specific TDD UL/DL configuration. In a further example, the WTRU may use a set of fixed and/or predetermined DL (or UL) subframes, for example, having one set consist of DL subframe {0,1,5,6} and having the other set consist of other DL subframes of the cell specific TDD UL/DL configuration. In yet another example, a WTRU may receive implicitly and/or explicitly an indication of the set of DL (or UL) HARQ processes from the eNode B. For example, the WTRU may receive a bit-map indicating the subframe set for each set of DL (or UL) HARQ processes from the eNode B.

Some examples may relate to using a single reference configuration for all DL HARQ processes. For example, the WTRU may receive two different TDD UL/DL reference configurations, for example a cell-specific TDD UL/DL configuration and a WTRU-specific UL/DL configuration, where the configurations may be different.

A WTRU may consider a subframe as an FDR subframe, for example, an FDRS, if the same subframe has a different direction in two of the reference configurations it may have received. A WTRU may send and/or receive at the same time in an FDRS subframe.

In one example, the WTRU may follow one TDD UL/DL reference configuration (for example, the WTRU-specific configuration config_ue_1) for all DL HARQ processes and another TDD UL/DL reference configuration (for example, the cell-specific reference configuration config_cell) for all UL HARQ processes where the two reference configurations may be different. The UL subframes of the cell-specific reference configuration may be a superset of those of the WTRU-specific configuration. The WTRU may receive and process grants according to these reference configurations for transmission and reception in the same subframe.

A WTRU may use config_cell as a reference for UL scheduling and/or PUSCH HARQ timing. UL scheduling may include one or more of receiving UL grants in the indicated DL subframes, using the timing between the reception of the UL grant (or UL HARQ feedback through PHICH), and timing of the transmission (or re-transmission) of the UL data. PUSCH HARQ timing may include the timing between the transmission of the UL data and the reception of its corresponding HARQ feedback, for example, PHICH.

A WTRU may monitor PDCCH and/or ePDCCH and/or receive a PDSCH grant and possibly its corresponding PDSCH transmission in a DL subframe indicated by a WTRU-specific or procedure-specific TDD configuration, for example, config_ue_1. The FDR capable WTRU may refer to this configuration as the DL reference configuration.

A WTRU may provide the HARQ feedback for a PDSCH reception according to the timing of a reference WTRU-specific config_ue_1.

Some examples may relate to using two or more reference configurations for different DL HARQ processes. A percentage of FDR subframes may be determined with respect to the subframes which have different UL/DL directions in the UL and DL reference configurations. In order to increase the percentage of FDRS, one may choose the UL TDD reference configuration as a UL heavy configuration, for example, TDD UL/DL configuration 0, and the DL TDD reference configuration as a DL heavy configuration, for example, TDD UL/DL configuration 5. By doing so, up to 50% of the subframes may be used as FDR subframes. However, a possible disadvantage may be that TDD UL/DL configuration 5 has only one UL subframe which means that all DL HARQ feedback, for example, carried by the PUCCH, should be accommodated in subframe #2. This may make subframe #2 congested.

In an example, different DL HARQ processes may follow different DL TDD UL/DL reference configurations. This may enable the use of more UL subframes for DL feedback. For subframes which may be indicated as DL in both the UL and DL TDD reference configurations, for example, cell-specific and WTRU-specific TDD UL/DL configurations, respectively, the WTRU may use the cell-specific TDD UL/DL reference configuration for the DL HARQ processes related to those subframes.

For subframes which may be indicated as DL in one configuration, for example, a WTRU-specific TDD UL/DL configuration, and UL in the other configuration, for example, a cell specific TDD UL/DL configuration, the WTRU may use the WTRU-specific TDD UL/DL reference configuration for the DL HARQ processes related to those subframes.

A WTRU may (or may only) expect DL grant and/or PDSCH reception in one of the DL subframes indicated in a WTRU-specific TDD UL/DL configuration, for example, a DL reference configuration. A WTRU may (or may only) transmit a PUSCH in one of the WTRU subframes indicated in the cell-specific TDD UL/DL configuration, for example, a UL reference configuration.

A WTRU may (or may only) expect a UL grant in a DL subframe indicated in the UL reference configuration. For a received UL grant, the WTRU may (or may only) transmit PUSCH and may expect its corresponding PHICH according to the timing of the same UL reference configuration. A WTRU may maintain sets of subframes and use the reference configuration for the DL HARQ processes according to the set to which the subframe may belong.

A WTRU may maintain a set of subframes which may be indicated as DL subframes in both the UL and DL TDD reference configurations, for example, cell-specific and WTRU-specific TDD UL/DL configurations, respectively. If the WTRU receives a PDSCH in one of the subframes of this set, then the WTRU may provide the HARQ feedback according to the timing and/or UL resources indicated by the UL reference TDD UL/DL configuration, for example, the cell-specific configuration.

In another example, a WTRU may maintain a second set of subframes which may be indicated as DL subframes in the DL reference TDD configurations, for example, a WTRU-specific TDD UL/DL configuration, and at the same time, as UL subframes in the UL reference TDD configuration, for example, a cell-specific TDD UL/DL configuration. If the WTRU receives a PDSCH in one of the subframes of this set, then the WTRU may provide the HARQ feedback according to the timing and/or UL resources indicated by the DL reference TDD UL/DL configuration, for example, WTRU-specific configuration.

Figure 9:
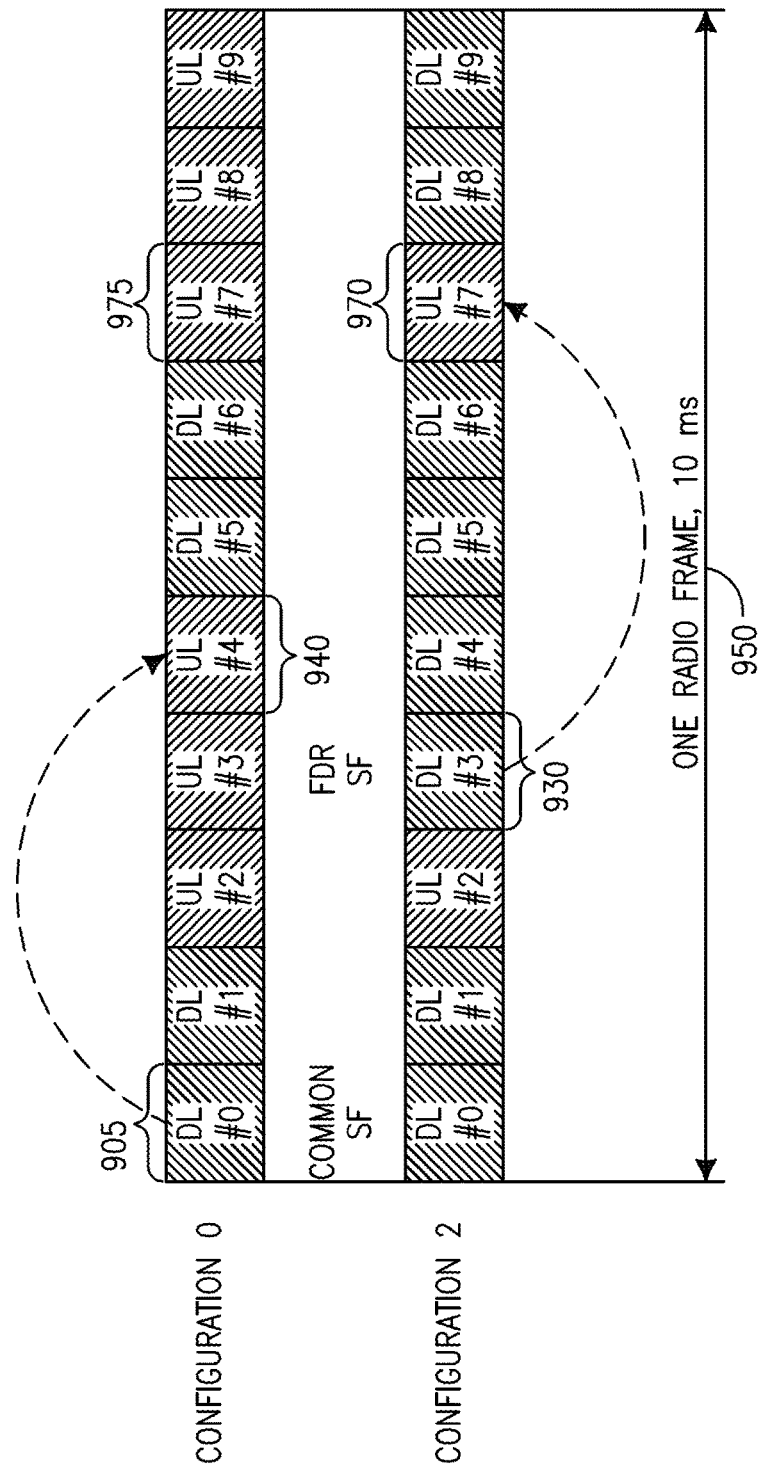
FIG. 9 is a diagram illustrating an example of DL HARQ feedback timing via a Physical UL Control Channel (PUCCH).

FIG. 9 is a diagram illustrating an example of DL HARQ feedback timing via a PUCCH. In an example frame structure 900, radio frame 950 may consist of ten subframes, subframe #0 through subframe #9. In an example, static timing may be applied and the HARQ process timing may be dependent on the subframe in which grants are received. Further, the HARQ process timing may be based on rules known by the WTRU and eNode B before the WTRU receives the grants. In an example shown in frame structure 900, the grants may be received by the WTRU in the first subframe, subframe #0, for both TDD UL/DL configurations. Further, a grant may include the HARQ process timing. Also, the WTRU may apply the HARQ process timing based on the grant. For example, the grant may indicate which subframes to use for HARQ feedback, including DL HARQ feedback.

The WTRU may receive two TDD UL/DL configurations, configuration 0 which may be a UL heavy configuration, and configuration 2 which may be a DL heavy configuration. In an example, some subframes, such as subframe #0 may be a common subframe and may be a DL subframe in both configurations. Further, other subframes, such as subframe #3, may be an FDR subframe and may be an UL subframe in a first configuration and a DL subframe in a second configuration.

In an example, the WTRU may receive an indication of one TDD UL/DL configuration and another indication of another TDD UL/DL configuration. Further, the WTRU may receive a grant in a DL subframe common to both TDD UL/DL configurations. The WTRU may apply the HARQ process timing associated with one of the TDD UL/DL configurations.

In an example, the WTRU may always choose to apply the HARQ process timing of the UL heavy configuration for UL HARQ feedback. Further, the WTRU may always choose to apply the HARQ process timing of the DL heavy configuration for DL HARQ feedback.

In a further example, as shown in frame structure 900, when grants are received in a DL subframe common the both configurations, such as subframe #0, the WTRU may choose to follow and apply the HARQ process timing of the UL heavy configuration for DL HARQ feedback. For example, in configuration 2, which may be a DL heavy configuration, UL subframe #7, shown in 970, may carry DL HARQ feedback bits for DL subframe #3, shown in 930. Further, in configuration 0, which may be a UL heavy configuration, UL subframe #4, shown in 940, may carry DL HARQ feedback bits for DL subframe #0, shown in 905.

In an example, a grant in a DL subframe in a UL heavy configuration may include the HARQ process timing. Also, the WTRU may apply the HARQ process timing based on the grant. In a further example, the WTRU may apply the HARQ process timing based on the receipt of the indication of one TDD UL/DL configuration. In another example, the WTRU may apply the HARQ process timing based on the receipt of the indication of another TDD UL/DL configuration. In yet a further example, the WTRU may apply the HARQ process timing based on the receipt of the UL heavy configuration. For example, the UL heavy configuration may indicate which subframes to use for DL HARQ feedback.

In a further example, the grant may include an indication that the WTRU apply the timing of one of the TDD UL/DL configurations. Further, in an example, the subframes of the two received TDD UL/DL configurations may be offset from each other. In a further example, the subframes may be offset based on an indication of an offset value received by the WTRU. Further, the indication may be received in the grant or in an indication of a TDD UL/DL configuration. In a further example, the subframes may be offset based on the indication of one TDD UL/DL configuration or the other indication of the other TDD UL/DL configuration or both.

In a further example, if the WTRU had chosen the HARQ process timing of configuration 2 for DL HARQ feedback for configuration 0, subframe #7, shown in 975, may have carried the DL HARQ feedback bits for DL subframe #0. This may have made subframe #7 congested because it may carry the DL HARQ feedback for both subframe 930 and subframe 905. Further, the processing of the feedback bits may have been delayed by three subframes which may result in an inefficient use of resources during the delay.

In some examples, two or more TDD cells may be mapped to the same carrier and may be OCs (OCs). For example, a WTRU may be configured with two or more TDD UL/DL configurations, all mapped to the same set of physical resources, for example, the same carrier. These two or more TDD UL/DL configurations may be referred to as overlapped TDD configurations or OCs.

In such examples, CA principles may be applied to determine the HARQ processing rules. This example may provide more flexibility in HARQ process timing and, for example with enhancements as disclosed herein, may enable more subframes to support FDR.

In such examples, the WTRU may receive 2 UL/DL configurations for the same TDD cell. The WTRU may treat these configurations as if they were for independent cells except for the subframes in which they have the same direction. In a subframe in which the configurations have opposite directions, DL reception may follow the processes of the configuration that is DL in that subframe and UL transmission may follow the processes of the configuration that is UL in that subframe. For subframes which are DL or UL in both configurations, special rules are needed to identify which processes to follow, for example, since the same set of resources in that subframe (either DL or UL resources) may need to be shared between two configurations to maintain their ongoing processes.

The OCs may be configured. For example, a primary OC (POC) may be defined or may be configured. The POC may be or may correspond to the TDD UL/DL configuration which may be broadcast by the cell (for example, in system information such as in a SIB such as SIB1). The POC may be defined or may be configured as the TDD UL/DL configuration which may be used for legacy WTRUs.

A secondary OC (SOC) may be or may correspond to a TDD UL/DL configuration which may be provided to a WTRU via higher layer signaling such as RRC or medium access control (MAC) control element (CE). The SOC may be configured via downlink control channel including PDCCH (or EPDCCH). One or more of the following may apply. The PDCCH containing SOC configurations may be located in common search space in a predefined set of subframes. For instance, subframe #0 in each radio frame or each group of radio frames may include the PDCCH containing SOC configurations. Further, the PDCCH containing SOC configurations may be scrambled with FDR specific radio network temporary identifier (RNTI). For instance, an F-RNTI (FDR RNTI) may be defined and the CRC for the PDCCH containing SOC configurations may be scrambled with F-RNTI. In addition, the PDCCH containing SOC configurations may be (or may only be) monitored by the WTRU in the DL subframes of the POC.

The OCs may be used in a fallback operation. For example, the POC may be used as a fall back TDD UL/DL configuration. In an example, if the eNode B may inform the WTRU (for example, via physical or higher layer signaling) that FDR scheduling may not be performed, the WTRU may use only the POC configuration. As another example, if a channel condition for a WTRU supporting FDR operation may meet a certain condition, the WTRU may fall back to a non-FDR mode where the WTRU may only use one TDD UL/DL configuration or one OC.

The certain condition for non-FDR operation may include a downlink measurement falling below a predefined threshold. For example, a reference signal received power (RSRP) measurement may be lower than a threshold or self-interference may be above a threshold.

The certain condition may include a CSI feedback indicating the current channel condition may meet a predefined channel condition. For example, a wideband CQI in a CSI feedback may be below a predefined threshold and the reported rank may be one.

Reference signals may be configured for OCs. In an example, the reference signal may be differently configured for POC and SOC. In this case, one or more of following may apply. In an example, the number of cell-specific reference signal (CRS) ports may be different for POC and SOC, where in an example, 4 CRS ports may be used for POC while 1 CRS port may be used for SOC. Further, the number of CRS ports for POC may be detected during a physical broadcast channel (PBCH) reception procedure while the number of CRS port for SOC may be informed via higher layer signaling. In a further example, the CRS may be transmitted only in POC and no CRS may be transmitted in SOC. Further, all transmission modes may be supported in POC while a subset of transmission modes may be supported in SOC. For example, demodulation-reference signal (DM-RS) based transmission modes (e.g., TM-8, TM-9) may be only supported in the SOC. In a further example, a certain downlink measurement may be only supported in POC, for example, RSRP and reference signal received quality (RSRQ) may be only measured in POC. In a still further example, the CRS may be transmitted only in a subset of subframes in SOC while all subframes may include CRS in POC. Further, for the subframes in which POC and SOC may both be DL, the CRS may follow the rules for POC.

Control signaling may be configured for OCs. PDCCH and/or EPDCCH configurations may be different for POC and SOC. For example, a WTRU-specific search space may be configured in a PDCCH region for POC while a WTRU-specific search space may be configured in an EPDCCH region for SOC, where the PDCCH may be demodulated with CRS and the EPDCCH may be demodulated with DM-RS. In another example, PDCCH may be used for common search space in POC while EPDCCH may be used for SOC. Further, one or more of following may apply: a WTRU-specific search space in downlink subframes in POC and a WTRU-specific search space in downlink subframes in SOC may be independently configured, and/or the cell-RNTI (C-RNTI) may be differently configured for POC and SOC.

Examples are disclosed herein of the operation of two or more OCs. In legacy systems where a WTRU may have access to more than one physical cell, it may use the rules and principles of CA for their joint operation. The operation of the primary cell (PCell) may not be impacted by the presence of the secondary cell (SCell). For the SCell, two modes of scheduling may be supported in CA: self-scheduling and cross-carrier scheduling. In self-scheduling, the same SCell may be used to schedule UL/DL data, for example, to carry UL/DL grants, and receive UL HARQ feedback, for example, carried via the PHICH. In cross-carrier scheduling, the primary cell may be used to schedule the SCell UL/DL data, for example, to carry UL/DL grants, and UL HARQ feedback, for example, via the PHICH. In both cases, the DL HARQ feedback, for example, via the PUCCH and/or the PUSCH, may be always carried on the PCell.

The same legacy CA rules are not readily applicable to the operation of the primary and secondary OCs. Some, but not all, of the reasons may be as follows. In an example, if cross-carrier scheduling is used, for example, for DL grants, then a subframe which is indicated DL in SOC and at the same time is indicated as a UL in POC, cannot be granted in the SOC since the POC cannot carry any DL grant in that subframe. On the other hand, if the self-scheduling technique is used for SOC, then in some cases the WTRU may not be able to send an SOC PUCCH to the eNode B since the same subframe in POC is indicated as a DL subframe. To solve these problems, examples are disclosed herein, where different CA rules may be reused for the operation of the OCs which may depend on different factors, such as a subframe index.

Cross-carriers scheduling and self-scheduling for OCs may be subframe-dependent. In an example, a WTRU may maintain two or more sets of SOC subframes (for example, DL subframes) where for one set it may expect to receive DL (or UL) self-scheduling grants and for another set it may expect to receive DL (or UL) cross-carrier scheduling grants which may be carried on POC (which, for example, may be provided according to the POC TDD UL/DL configuration). The WTRU may determine the sets of DL subframes for each type of scheduling using one or a combination of the following: a function of the POC and/or SOC TDD UL/DL configurations; a function of a WTRU-specific TDD UL/DL configuration; a set of fixed and/or predetermined subframes (for example, DL subframes), having, for example, one set consisting of certain DL subframes (for example, {0,1,5,6}) and having the other set consist of certain other DL subframes of a cell specific (or POC) TDD UL/DL configuration and/or the SOC TDD UL/DL configuration; and/or an implicit and/or explicit indication from the eNode B. For example, the WTRU may receive an indication (for example, via a bit-map) of the subframe set for one or more subframes from the eNode B.

As an example, the subframes which may be DL in both the POC and SOC TDD UL/DL configurations may be in a first set and the other DL subframes in the SOC TDD UL/DL configuration may be in a second set. The first set may use cross-carrier scheduling grants. The second set may use self-scheduling grants.

Use of a particular OC or TDD UL/DL configuration for grants may include use of the structure of the control region according to that OC or TDD UL/DL configuration. POC may always be self-scheduled. No matter if a SOC receives a cross-carrier and/or self-scheduling grant, it may follow the HARQ timing and/or resources of the SOC specific TDD UL/DL configuration to perform the related HARQ procedures.

The cross-carrier scheduling grant may indicate which reference configuration and/or timing to apply to the corresponding grant. For example, the WTRU may maintain two TDD UL/DL reference configurations (for example, POC and SOC) for the UL and/or DL HARQ processes and may apply the indicted reference configuration to the corresponding UL and/or DL grants and their related procedures. For example, the WTRU may use the Carrier Indicator Field (CIF) of the cross-carrier scheduling grant to determine which reference configuration to be applied to the corresponding grant.

POC and/or SOC PUCCH transmission may be subframe-dependent. A WTRU may maintain two or more sets of SOC UL subframes where for one set it may use the SOC rules, for example, the PUCCH resource allocation, to send the SOC UCI, for example, via the PUCCH and/or the PUSCH, and for another set of UL subframes it may use the POC rules, for example, the PUCCH resource allocation, to send the SOC UCI, for example, via the PUCCH and/or the PUSCH. These rules may include, but are not limited to, resource allocation, bundling procedures, and the like. The WTRU may determine the set of UL subframes using one or a combination of the following. The WTRU may use a function of the POC and/or SOC TDD UL/DL configurations. Further, the WTRU may use a function of a WTRU-specific TDD UL/DL configuration. In addition, the WTRU may use a set of fixed and/or predetermined subframes (for example, UL subframes), having, for example, one set consist of certain UL subframes (for example, {3,7}) and the other set consist of certain other UL subframes of a cell specific (or POC) and/or the SOC TDD UL/DL configuration. The WTRU may also use an implicit and/or explicit indication from the eNode B. For example, the WTRU may receive an indication (for example, via a bit-map) of the subframe set for one or more subframes from the eNode B.

As an example, the subframes which may be UL in both the POC and SOC TDD UL/DL configuration may be in a first set and the other UL subframes in the SOC TDD UL/DL configuration may be in a second set. The first set may use the PUCCH resource allocation according to the POC. The second set may use the PUCCH resource allocation according to the SOC.

POC and/or SOC PHICH reception may be subframe-dependent. In an example, upon the transmission of a SOC self-scheduled (for example, scheduled according to the rules of SOC) PUSCH transmission by a WTRU, a WTRU may expect to receive an SOC UL HARQ feedback, for example, the PHICH, according to the PHICH rules of the SOC. Upon the transmission of a SOC cross-carrier scheduled (for example, scheduled according to the rules POC) PUSCH transmission by a WTRU, a WTRU may expect to receive a SOC UL HARQ feedback, for example, the PHICH, according to the PHICH rules of the POC.

A WTRU may maintain two or more sets of SOC DL subframes where for one set it may use the SOC rules to expect an SOC UL HARQ feedback, for example the PHICH, and for another set it may use the POC PHICH rules to expect a SOC UL HARQ feedback, for example, the PHICH. The PHICH rules may include, but not limited to, PHICH resource location, PHICH timing, and the like.

POC and/or SOC determination may be subframe dependent. A WTRU may maintain two or more sets of subframes where for one set it may consider one OC as the POC and for another set of subframes it may consider another OC as the POC. The WTRU may determine the set of subframes using one or a combination of the following. In an example, the WTRU may use a function of the configured OCs for a particular WTRU. In another example, the WTRU may use a function of a WTRU-specific TDD UL/DL configuration. In a further example, the WTRU may use a set of fixed and/or predetermined subframes, for example, having one set consist of certain subframes (for example, {0,1,5,6}) and having the other set consist of certain other subframes. In yet a further example, the WTRU may use an implicit and/or explicit indication from the eNode B. For example, the WTRU may receive an indication (for example, via a bit-map) of the subframe set for one or more subframes from the eNode B.

Some examples may relate to the subframe-dependent operation of two or more OCs, for example, where a WTRU may be configured with two or more OCs. In such examples, one or more of the following may apply.

A WTRU may receive, detect and/or be configured with a TDD UL/DL configuration which may be or may correspond to an OC. The WTRU may consider the TDD UL/DL configuration or OC as a POC. For example, the WTRU may consider the cell specific TDD UL/DL configuration of a cell as the POC.

The WTRU may be configured with another TDD UL/DL configuration (for example, via RRC signaling) which may be or may correspond to an OC. The WTRU may consider the TDD UL/DL configuration or OC as a SOC.

For a subframe which may be indicated with the same direction, either as DL or UL, in both POC and SOC TDD UL/DL configurations, the WTRU may expect the subframe structure, for example, resource element mapping, to be the same as those of the POC. For example, if in a common DL subframe, the POC may have PHICH resources and the SOC may not, then the WTRU may assume that that DL subframe has the same PHICH resources as those of the POC DL subframe.

The WTRU may maintain at least one (for example, all 4) of the following sets of subframes: set_dl_dl may refer to the subframe set consisting of subframes which are DL in the POC and DL in the SOC; set_dl_ul may refer to the subframe set consisting of subframes which are DL in the POC and UL in the SOC; set_ul_dl may refer to the subframe set consisting of subframes which are UL in the POC and DL in the SOC; and set_ul_ul may refer to the subframe set consisting of subframes which are UL in the POC and UL in the SOC.

The WTRU may expect self-scheduling grants for the POC. The WTRU may follow the scheduling and/or HARQ timing and procedures of the POC for all DL and/or UL data initially transmitted on the POC.

In a DL subframe of subframe set set_dl_dl, the WTRU may expect an SOC cross-carrier scheduling UL and/or DL grant possibly according to the rules of the POC. In a SOC DL subframe of subframe set set_ul_dl, the WTRU may expect an SOC self-scheduling UL and/or DL grant possibly according to the rules of the SOC.

A WTRU may expect an SOC UL HARQ feedback, for example, a PHICH, in a DL subframe of the subframe set set_dl_dl according to the POC PHICH rules, for example, PHICH resource mapping. If the POC does not have any PHICH resources in that DL subframe, then the WTRU may not expect to detect any SOC PHICH.

A WTRU may expect a SOC UL HARQ feedback, for example, a PHICH, in a SOC DL subframe of the subframe set set_ul_dl according to the POC PHICH rules, for example, PHICH resource mapping. A WTRU may transmit a SOC DL HARQ feedback, for example, via PUCCH, in a UL subframe of the subframe set set_ul_ul according to the POC PUCCH rules, for example, PUCCH resource mapping. A WTRU may transmit a SOC DL HARQ feedback, for example, via PUCCH, in a SOC UL subframe of the subframe set set_dl_ul according to the SOC PUCCH rules, for example, PUCCH resource mapping.

Examples disclosed herein include a mechanism for creating full duplex subframes. By providing at least 2 TDD UL/DL configurations where some of the subframes in those configurations may have opposite directions, the opportunity for full duplex operation may be created. Full duplex operation may use FDR resources.

For example, a WTRU may be scheduled according to both configurations, so the WTRU may be scheduled for both UL and DL in the same subframe. An eNode B may also or instead schedule different WTRUs in the same subframe.

When the existing TDD UL/DL configurations are used unchanged for the configurations, some subframes may always be DL or UL. Use of those subframes for full duplex may as a result be restricted. Additional solutions provided herein may address this potential limitation.

Some examples may relate to TDD configurations having different frame boundaries. In various solutions this may be used to create more FDR subframes.

Figure 10:
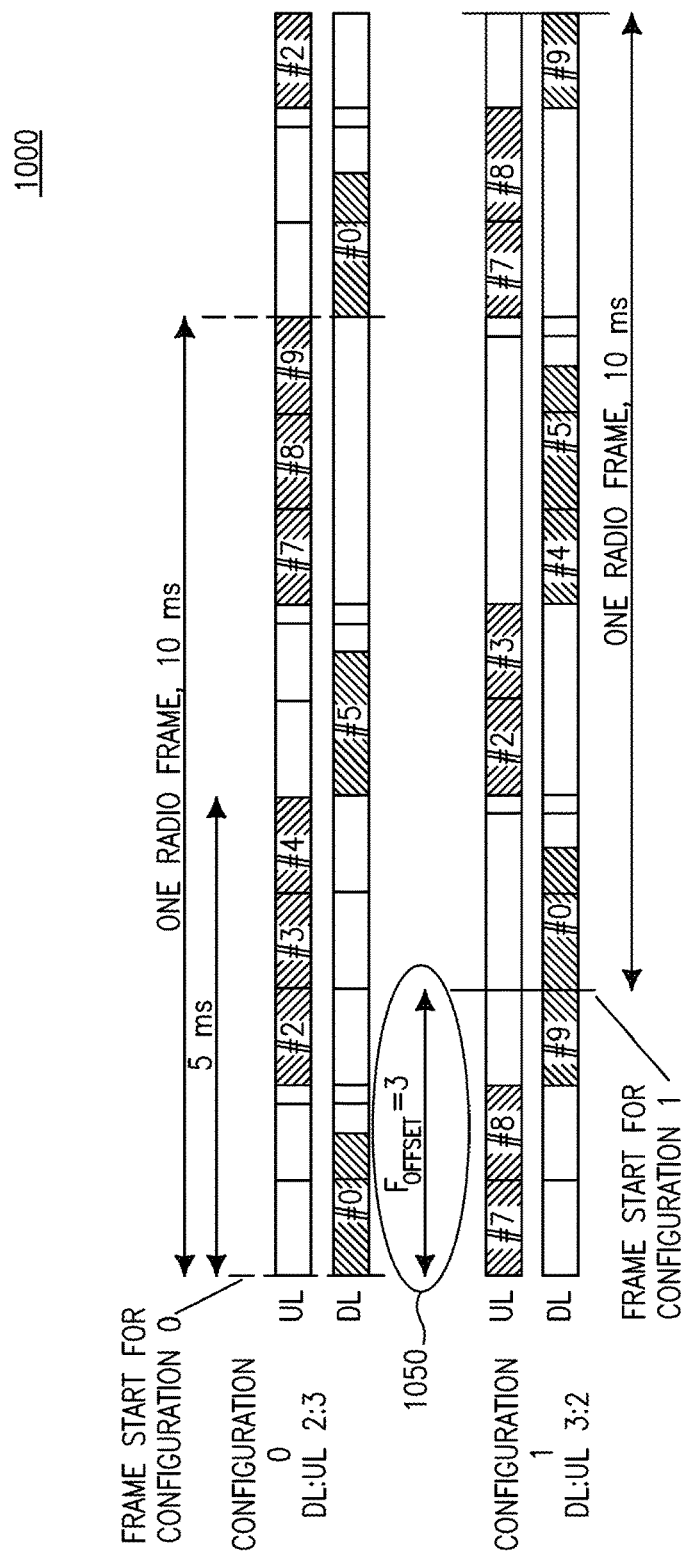
FIG. 10 is a diagram illustrating an example of a frame boundary offset for multiple overlapping cells using multiple TDD UL/DL configurations.

FIG. 10 is a diagram illustrating an example of a frame boundary offset for multiple overlapping cells using multiple TDD UL/DL configurations. In an example, OCs may have different frame boundaries. As an example, the configured two or more OCs may have different frame boundaries in order to allow more FDR subframes. As an example, two TDD UL/DL configurations 0 and 1 may be configured as OCs and the TDD UL/DL configuration 1 may have a frame boundary offset (FOffset) of 3 subframes 1050 compared with the TDD UL/DL configuration 0, as shown in FIG. 10. All subframes may now have uplink and downlink resources, per the configurations 1000.

A WTRU may be scheduled according to both configurations, so that the WTRU may be scheduled for both UL and DL in the same subframe, as shown in FIG. 10. In this case, all subframes may be used for full duplex operation and the HARQ timing for each configuration may not be affected.

Figure 11:
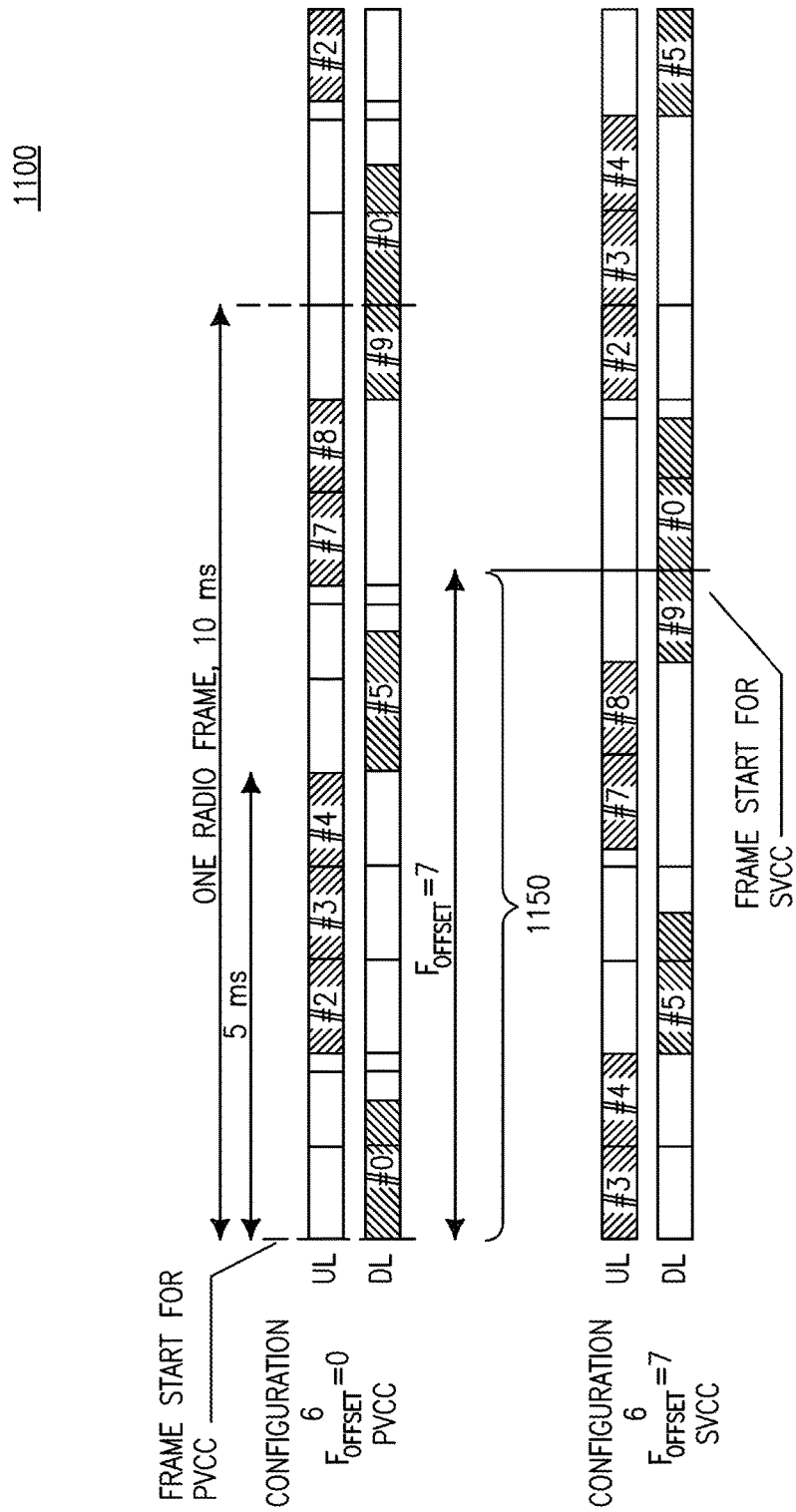
FIG. 11 is a diagram illustrating an example of a frame boundary offset for multiple overlapping cells using a single TDD UL/DL configuration.

FIG. 11 is a diagram illustrating an example of a frame boundary offset for multiple overlapping cells using a single TDD UL/DL configuration. In another example, a single TDD UL/DL configuration may be configured for the POC and SOC may be configured or may be defined with frame boundary offsets. As an example, the TDD UL/DL configuration 6 may be configured as the TDD UL/DL configuration, the FOffset=0 may be used for the POC, and the FOffset=7 may be used for the SOC 1150. In this case, all subframes in a radio frame may have both uplink and downlink as shown in the configurations 1100.

In such examples, one or more of following may apply. The POC configuration may be indicated or may be configured, for example via broadcast signaling such as in system information (for example, an SIB such as SIB1).

Further, SOC configuration may be indicated or may be configured with at least one of following. A set of frame boundary offsets may be informed via broadcasting, higher layer signaling, or a downlink control channel. As an example, FOffset (for example, {7}) may be configured for an SOC. The FOffset for an SOC may be predefined according to the POC configuration. For example, FOffset=7 may be used for the TDD UL/DL configuration 6 while FOffset=2 may be used for the TDD UL/DL configuration 0. Therefore, the FOffset for a SOC may be defined as a function of the TDD UL/DL configuration for the POC.

The frame offset of an OC may be determined. A WTRU may synchronize with the frame boundary of a certain overlapped cell (OC) which may contain the synchronization channels and the WTRU may derive the subframe boundaries for other OCs. As an example, the certain OC may be the POC and the frame boundary offset may be defined for SOC(s). Therefore, the frame boundary offset for POC may be considered as '0' always.

The synchronization channel may only be located in the POC with a certain predefined condition. For example, the frame boundary offset number for SOC may be a predefined condition. As an example, if the frame boundary offset for all SOC is 0, the synchronization channel may be located in SOC.

Special subframes undergo reconfiguration for UL or DL. In an example, the legacy subframe configurations including a special subframe which may include DwPTS, GP, and UpPTS may be used for the POC. On the other hand, the special subframe may be reused as either a UL subframe or a DL subframe in the SOC.

Figure 12:
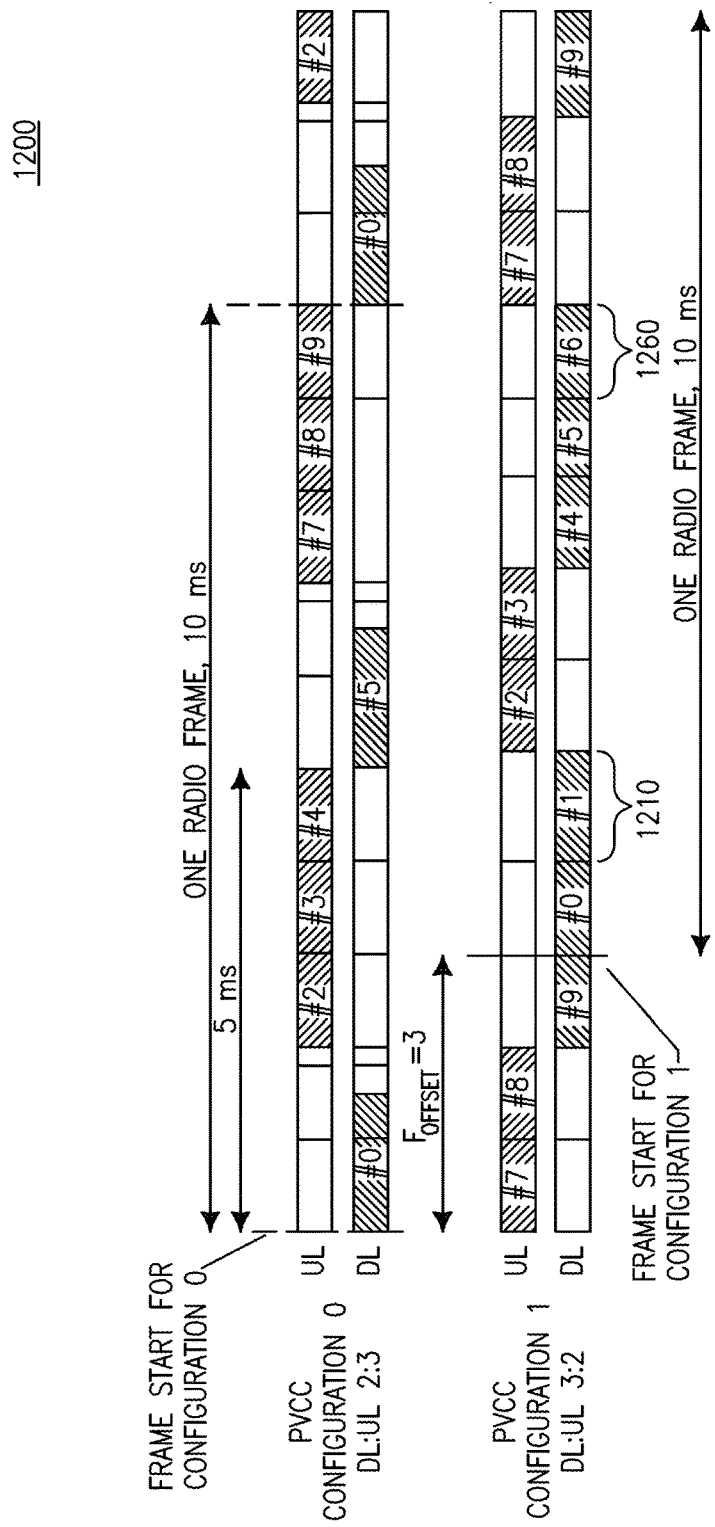
FIG. 12 is a diagram illustrating an example subframe configuration for a primary overlapped cell (OC) (POC) and a secondary OC (SOC)

FIG. 12 is a diagram illustrating an example subframe configuration for a primary OC (POC) and a secondary OC (SOC). As shown in the configurations 1200, TDD UL/DL configuration with a frame boundary offset may be configured for the SOC, however, one or more special subframes 1210, 1260 may be used as a DL subframe. One or more of following may apply. The use of special subframes may be predefined. For example, all special subframes in the SOC may be used as DL subframes. Alternatively, all special subframes in the SOC may be used as UL subframes. The use of a special subframe may be configured in a broadcasting channel (for example, SIB). The special subframe may be used as either an UL or a DL subframe according to the configuration.

A configured, indicated and/or signaled reference TDD UL/DL configuration may have a non-zero frame boundary offset compared to that of another TDD (overlapped) cell, TDD UL/DL configuration, reference TDD UL/DL configuration, cell specific TDD UL/DL configuration, and the like. The frame boundary offset may be considered as one of the configuration parameters of a reference TDD UL/DL configuration and may be used, along with other configuration parameters of a reference TDD UL/DL configuration, in examples disclosed herein for which the reference TDD UL/DL configuration may be applicable.

Some examples relate to dynamic UL/DL reference configurations. For example, in dynamic reference configurations, a WTRU may use different reference TDD UL/DL configurations for different DL (or UL) HARQ processes. A WTRU may monitor each subframe for a potential UL and/or DL grant. A WTRU may receive an indication of what reference TDD UL/DL configuration and/or frame boundary offset to use for a DL (or UL) HARQ process according to one or a combination of the following. A WTRU may receive such indication as a part of DL (or UL) grant of a DL (or UL) HARQ process. For example, the UL and/or DL grant may carry the index of the reference TDD UL/DL configuration and/or possibly the corresponding frame boundary offset of that configuration. A WTRU may expect different DCIs for the DL (or UL) grant. Depending on the detected DCI, the WTRU may use different reference TDD UL/DL configurations and/or different frame boundary offsets for the corresponding DL (or UL) grant. A WTRU may expect a different DL control channel with different properties, for example, a PDCCH, an ePDCCH, and the like. Depending on the detected DL control channel, the WTRU may use different reference TDD UL/DL configurations and/or different frame boundary offsets for the corresponding DL (or UL) grant. A WTRU may be configured with two or more DL control channel search spaces. Depending on the search space of the detected DL control channel, the WTRU may use different reference TDD UL/DL configurations and/or different frame boundary offsets for the corresponding DL (or UL) grant. A WTRU may receive such indication as a part of and/or encoded in the PDSCH itself.

Once a WTRU receives a UL and/or DL grant for a data transmission and/or reception along its reference TDD UL/DL configuration, the WTRU may follow timing of the same reference configuration for the rest of the procedures of that HARQ process. For example, such procedures for a DL HARQ may include the PUCCH timing and resource allocation. For example, such procedures for a UL HARQ may include the PUSCH (re)-transmission timing and/or resources, PHICH timing and/or resources, and the like.

Figure 13:
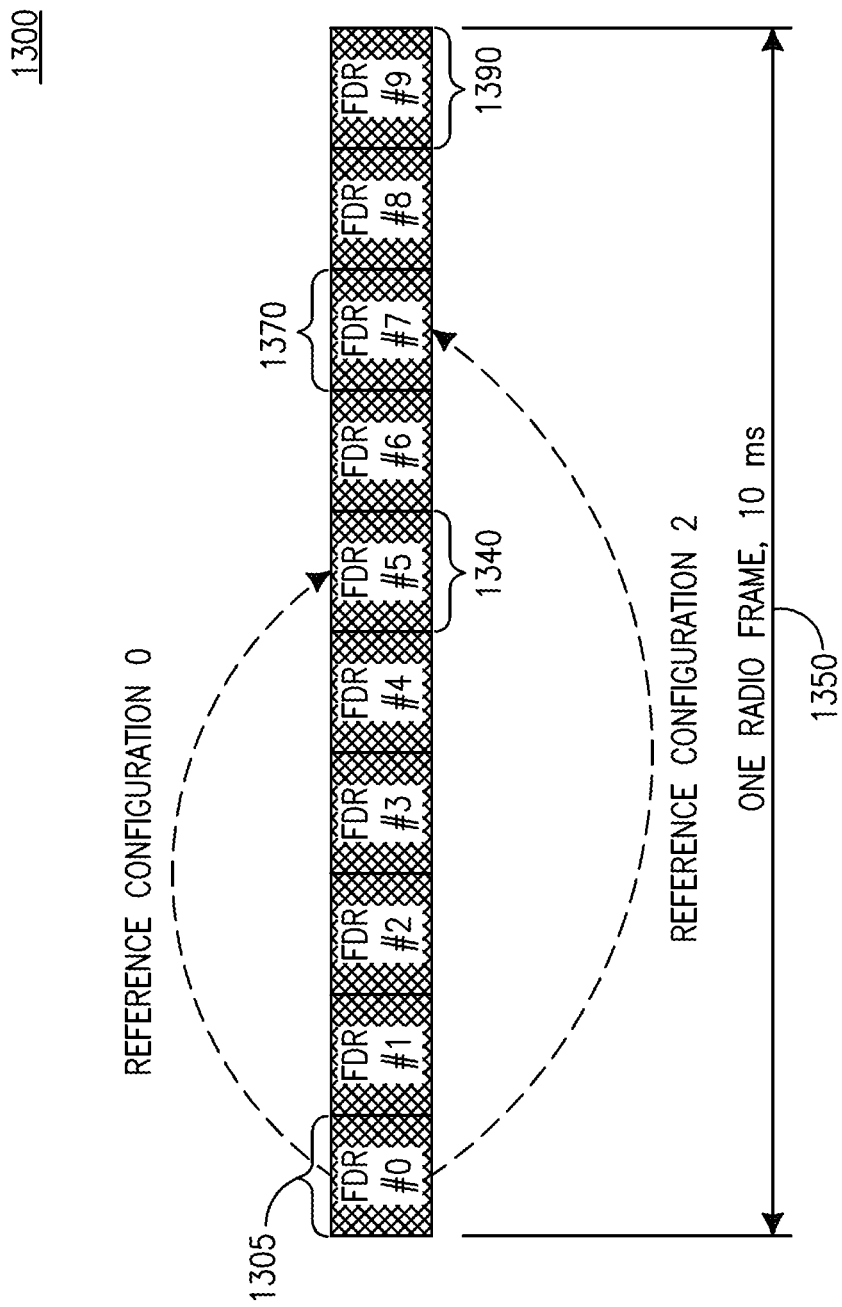
FIG. 13 is a diagram illustrating another example of DL HARQ feedback timing via a PUCCH.

FIG. 13 is a diagram illustrating another example of DL HARQ feedback timing via a PUCCH. In frame structure 1300, a radio frame 1350 may contain ten subframes, subframe #0 1305 through subframe #9 1390. In an example, dynamic HARQ process timing may be based on a dynamic timing indication in a grant that initiates the TDD UL/DL HARQ process. In an example, the WTRU may receive two TDD UL/DL configurations and may consider them to be OCs on the same carrier. CA type techniques may be used for subframes with a common direction, such as DL or UL. In an example, the HARQ process timing may be assigned by a scheduler, such as, for example, a serving eNode B.

In a further example, a WTRU may monitor all subframes, a set of subframes or designated subframes, for a potential UL grant or DL grant. The WTRU may receive a grant in a subframe. In an example, in the grant may include an indication of a reference TDD UL/DL configuration. In a further example, the grant may indicate the reference timing for a HARQ process. In another example, the reference timing may be indicated by the TDD UL/DL configuration, which may include a possible subframe shift. Further, the WTRU may apply the HARQ process timing associate with the TDD UL/DL configuration for DL HARQ feedback. The WTRU may apply HARQ process timing based on the grant. Further, the grant may indicate subframes to use for DL HARQ feedback. Further, the TDD UL/DL configuration may indicate one or more subframes to use for DL HARQ feedback.

For example, a WTRU may receive a grant in subframe #0 1305, which may be an FDR subframe which contains a DL transmission. In an example, the grant may include an indication of a reference TDD UL/DL configuration 0. The WTRU may apply the may apply HARQ process timing associated with reference TDD UL/DL configuration 0 for DL HARQ feedback and transmit DL HARQ feedback for subframe #0 1305 in subframe #5 1340. The WTRU may transmit DL HARQ feedback via a PUCCH.

In another example, the grant may include an indication of a reference TDD UL/DL configuration 2. The WTRU may apply the may apply HARQ process timing associated with reference TDD UL/DL configuration 2 for DL HARQ feedback and transmit DL HARQ feedback for subframe #0 1305 in subframe #7 1370. The WTRU may transmit DL HARQ feedback via a PUCCH.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method for hybrid automatic repeat request (HARQ) timing in a wireless transmit/receive unit (WTRU), the method comprising:
applying, by the WTRU, a first HARQ process timing to a first HARQ process;
receiving, by the WTRU, an indication of a configuration associated with a second HARQ process timing;
receiving, by the WTRU, a downlink (DL) grant in a DL subframe;
applying, by the WTRU, the first HARQ process timing to a second HARQ process on a condition that the DL grant is received in a first search space; and
applying, by the WTRU, the second HARQ process timing to a second HARQ process on a condition that the DL grant is received in a second search space.

2. The method of claim 1, wherein the first HARQ process timing is different than the second HARQ process timing.

3. The method of claim 1, wherein the first HARQ process timing is a defined HARQ process timing.

4. The method of claim 1, further comprising:
receiving, by the WTRU, the first HARQ process timing.

5. The method of claim 1, wherein the first search space is a common search space.

6. The method of claim 5, wherein the common search space is a DL control channel search space.

7. The method of claim 6, wherein the DL control channel search space is a Physical Downlink Control Channel (PDCCH) search space.

8. The method of claim 6, wherein the DL control channel search space is an Enhanced PDCCH (EPDCCH) search space.

9. The method of claim 1, wherein the second search space is a WTRU-specific search space.

10. The method of claim 9, wherein the second search space is a WTRU-specific search space and the first search space is a different WTRU-specific search space than the second search space.

11. The method of claim 1, further comprising:
receiving, by the WTRU, a second downlink (DL) grant in the DL subframe on a condition that the first search space is a common search space.

12. The method of claim 1, wherein the first search space is associated with a first radio network temporary identifier (RNTI) and the second search space is associated with a second RNTI.

13. The method of claim 1, wherein the first HARQ process timing is associated with a first time division duplex (TDD) uplink (UL)/DL configuration and the second HARQ process timing is associated with a second TDD UL/DL configuration.

14. The method of claim 13, wherein the DL subframe is common to both the first TDD UL/DL configuration and the second TDD UL/DL configuration.

15. The method of claim 1, wherein the DL grant indicates one or more subframes to use for DL HARQ feedback.

16. A wireless transmit/receive unit (WTRU), comprising:
- a processor, the processor configured to apply a first HARQ process timing to a first HARQ process;
- a transceiver operatively coupled to the processor, the transceiver and the processor configured to receive an indication of a configuration associated with a second HARQ process timing;
- the transceiver and the processor configured to receive a downlink (DL) grant in a DL subframe;
- the transceiver and the processor configured to apply the first HARQ process timing to a second HARQ process on a condition that the DL grant is received in a first search space; and
- the transceiver and the processor configured to apply the second HARQ process timing to a second HARQ process on a condition that the DL grant is received in a second search space.

17. The WTRU of claim 16, wherein the first HARQ process timing is different than the second HARQ process timing.

18. The WTRU of claim 16, wherein the first HARQ process timing is a defined HARQ process timing.

19. The WTRU of claim 16, further comprising:
- the transceiver and the processor configured to receive the first HARQ process timing.

20. The WTRU of claim 16, wherein the first search space is a common search space.

* * * * *